US012746809B2

(12) United States Patent
Tokuda et al.

(10) Patent No.: US 12,746,809 B2
(45) Date of Patent: Sep. 29, 2026

(54) UTILITY VEHICLE

(71) Applicant: KAWASAKI MOTORS, LTD., Hyogo (JP)

(72) Inventors: Jumpei Tokuda, Akashi (JP); Takahiro Jyouzaki, Akashi (JP)

(73) Assignee: KAWASAKI MOTORS, LTD., Hyogo (JP)

( * ) Notice: Subject to any disclaimer, the term of this patent is extended or adjusted under 35 U.S.C. 154(b) by 307 days.

(21) Appl. No.: 18/418,778

(22) Filed: Jan. 22, 2024

(65) Prior Publication Data

US 2024/0239184 A1 Jul. 18, 2024

Related U.S. Application Data

(63) Continuation-in-part of application No. 17/693,739, filed on Mar. 14, 2022, now Pat. No. 12,320,416, which is a continuation-in-part of application No. 17/314,587, filed on May 7, 2021, now Pat. No. 11,919,587.

(51) Int. Cl.
*B60K 11/06* (2006.01)
*B60K 13/04* (2006.01)

(52) U.S. Cl.
CPC .............. *B60K 11/06* (2013.01); *B60K 13/04* (2013.01)

(58) Field of Classification Search
CPC ................................ B60K 11/06; B60K 13/04
See application file for complete search history.

(56) References Cited

U.S. PATENT DOCUMENTS

| | | | | |
|---|---|---|---|---|
| 3,820,327 | A | 6/1974 | Henault | |
| 6,832,872 | B2 | 12/2004 | Koelm et al. | |
| 7,059,071 | B2 | 6/2006 | Hanafusa et al. | |
| 7,191,753 | B2 | 3/2007 | Sagara et al. | |
| 8,439,141 | B2 | 5/2013 | Bessho et al. | |
| 10,124,659 | B2 * | 11/2018 | Bessho | B60K 13/04 |
| 10,704,438 | B2 | 7/2020 | Swab | |
| 10,920,639 | B2 | 2/2021 | Kurasawa et al. | |
| 11,434,981 | B2 * | 9/2022 | Oyama | F16H 57/0416 |

(Continued)

FOREIGN PATENT DOCUMENTS

| | | |
|---|---|---|
| CN | 104564327 | 4/2015 |
| DE | 10 2004 009 376 | 9/2004 |

(Continued)

OTHER PUBLICATIONS

Office Action issued Dec. 2, 2024 in U.S. Appl. No. 17/693,739.
Office Action issued Feb. 6, 2026 in U.S. Appl. No. 18/233,396.

*Primary Examiner* — Jacob B Meyer
(74) *Attorney, Agent, or Firm* — Wenderoth, Lind & Ponack, L.L.P.

(57) ABSTRACT

A utility vehicle including an engine, an exhaust pipe connected to the engine and through which exhaust gas from the engine is discharged, a heat generating component that generates heat during driving of the engine, and an air guide that guides outside air from the heat generating component toward the exhaust pipe. The air guide includes an intake opening that is arranged facing the heat generating component and through which outside air is introduced, a fan that draws outside air into the intake opening, and an exhaust port through which outside air drawn in by the fan is discharged toward the exhaust pipe.

11 Claims, 16 Drawing Sheets

(56) References Cited

U.S. PATENT DOCUMENTS

| | | | |
|---|---|---|---|
| 2006/0011401 | A1 | 1/2006 | Nakamura et al. |
| 2007/0227793 | A1 | 10/2007 | Nozaki et al. |
| 2010/0186395 | A1 | 7/2010 | Yang et al. |
| 2011/0099990 | A1 | 5/2011 | Lang et al. |
| 2011/0239636 | A1 | 10/2011 | Brunet et al. |
| 2015/0128578 | A1 | 5/2015 | Helferich |
| 2016/0332676 | A1 | 11/2016 | Miller et al. |
| 2020/0122560 | A1 | 4/2020 | Ward et al. |
| 2020/0208731 | A1 | 7/2020 | Matsudo |
| 2021/0062704 | A1 | 3/2021 | Itoigawa |
| 2022/0355877 | A1 | 11/2022 | Jyouzaki |
| 2022/0356939 | A1 | 11/2022 | Shimatani et al. |
| 2024/0239184 | A1* | 7/2024 | Tokuda .................. B60K 11/06 |

FOREIGN PATENT DOCUMENTS

| | | |
|---|---|---|
| WO | 2004/078571 | 9/2004 |
| WO | 2013/079523 | 6/2013 |
| WO | 2018/030110 | 2/2018 |
| WO | 2018/030302 | 2/2018 |

* cited by examiner

UTILITY VEHICLE

BACKGROUND OF THE INVENTION

Technical Field

The present disclosure relates to a utility vehicle.

Related Art

US 2006/0011401 discloses an uneven terrain road traveling vehicle including an engine and a belt type transmission. The belt type transmission includes an intake duct for introducing cooling air and an exhaust duct for discharging exhaust air rearward after cooling of the transmission.

SUMMARY

US 2006/0011401 does not describe cooling of a heat generating component that generates heat during driving of an engine.

An object of the present disclosure is to provide a utility vehicle in which heat dissipation of a heat generating component that generates heat during driving of an engine can be improved.

The present disclosure relates to a utility vehicle including:

an engine;

an exhaust pipe connected to the engine and through which exhaust gas from the engine is discharged;

a heat generating component that generates heat during driving of the engine; and an air guiding mechanism that guides outside air from the heat generating component toward the exhaust pipe.

The air guiding mechanism includes:

an intake opening that is arranged facing the heat generating component and through which outside air is introduced;

a fan that draws outside air into the intake opening; and an exhaust port through which outside air drawn in by the fan is discharged toward the exhaust pipe.

According to the present disclosure, since the intake opening faces the heat generating component, air around the heat generating component is drawn into the intake opening. As a result, heat dissipation of the heat generating component is easily improved. Furthermore, outside air drawn into the intake opening after flowing around the heat generating component is guided by the air guiding mechanism, so that the exhaust pipe is cooled. This allows outside air drawn into the air guiding mechanism for cooling the exhaust pipe to be used for cooling the heat generating component. In other words, it is possible to cool the exhaust pipe by using outside air discharged from the air guiding mechanism after cooling the heat generating component.

BRIEF DESCRIPTION OF THE DRAWINGS

The foregoing and the other features of the present disclosure will become apparent from the following description and drawings of an illustrative embodiment of the disclosure in which.

DETAILED DESCRIPTION OF EMBODIMENTS

First Embodiment

A vehicle 100 according to a first embodiment of the present disclosure will be described with reference to FIGS. 1 to 11. The vehicle 100 according to the present embodiment is a utility vehicle. In the description below, the front-rear direction, left-right direction, and vertical direction as seen from the driver will be referred to as the front-rear direction, left-right direction, and vertical direction of the vehicle 100 and each component.

Figure 1:
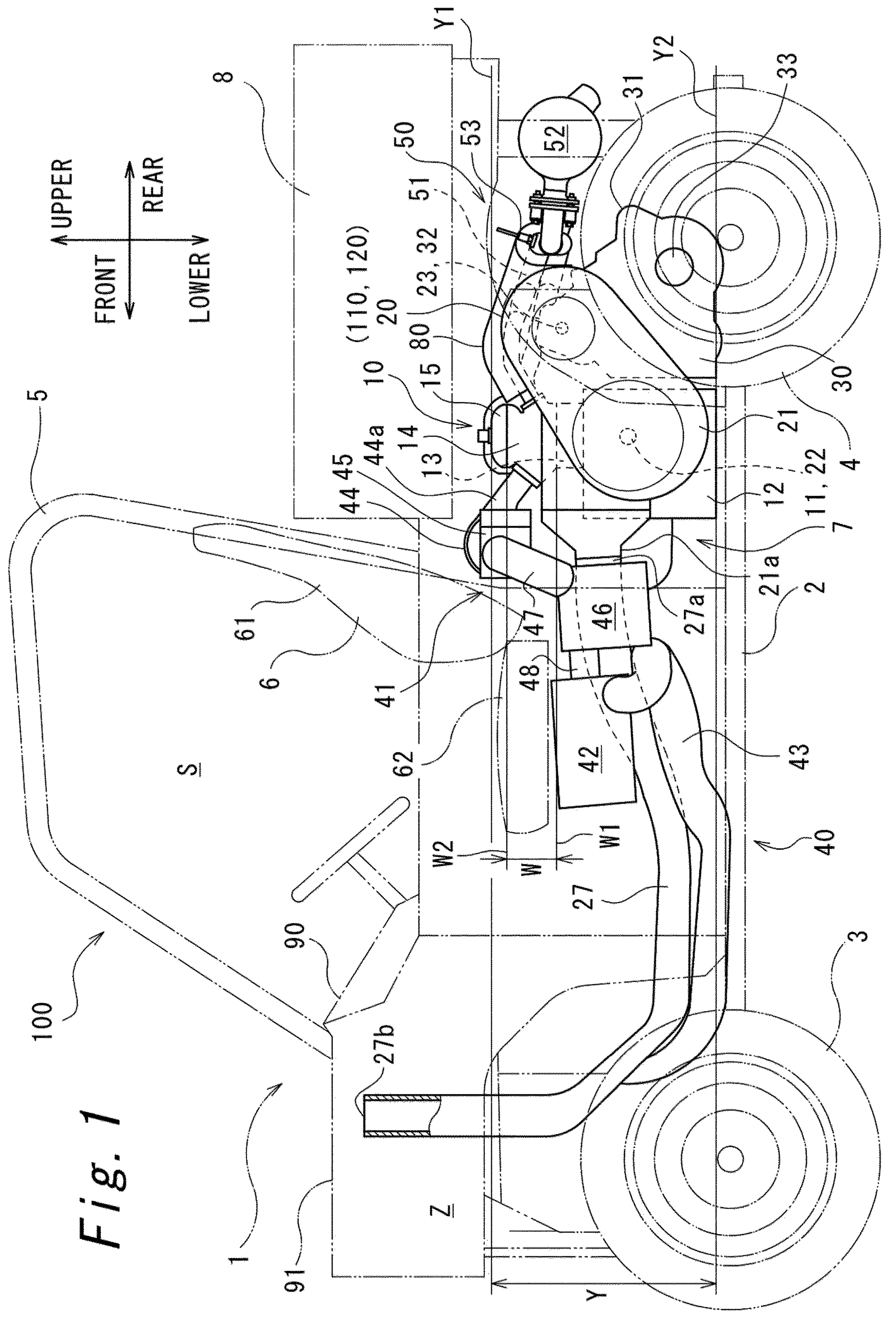
FIG. 1 is a left side view schematically illustrating a vehicle according to a first embodiment of the present disclosure.

FIG. 1 is a left side view of the vehicle 100. As shown in FIG. 1, the vehicle 100 has a vehicle body 1 and a powertrain mechanism 7 mounted on the vehicle body 1. Note that, in FIG. 1, the vehicle body 1 is shown by a chain double-dashed line, and the powertrain mechanism 7 is shown by a solid line.

The vehicle body 1 includes a vehicle body frame 2 that constitutes a framework. In the vehicle body 1, a pair of left and right front wheels 3 are disposed on both sides of the front portion of the vehicle body frame 2, and a pair of left and right rear wheels 4 are disposed on both sides of the rear portion of the vehicle body frame 2. Riding space S is located between the front wheel 3 and the rear wheel 4. The riding space S is surrounded by a ROPS (Rollover Protective Structure) 5.

Figure 2:
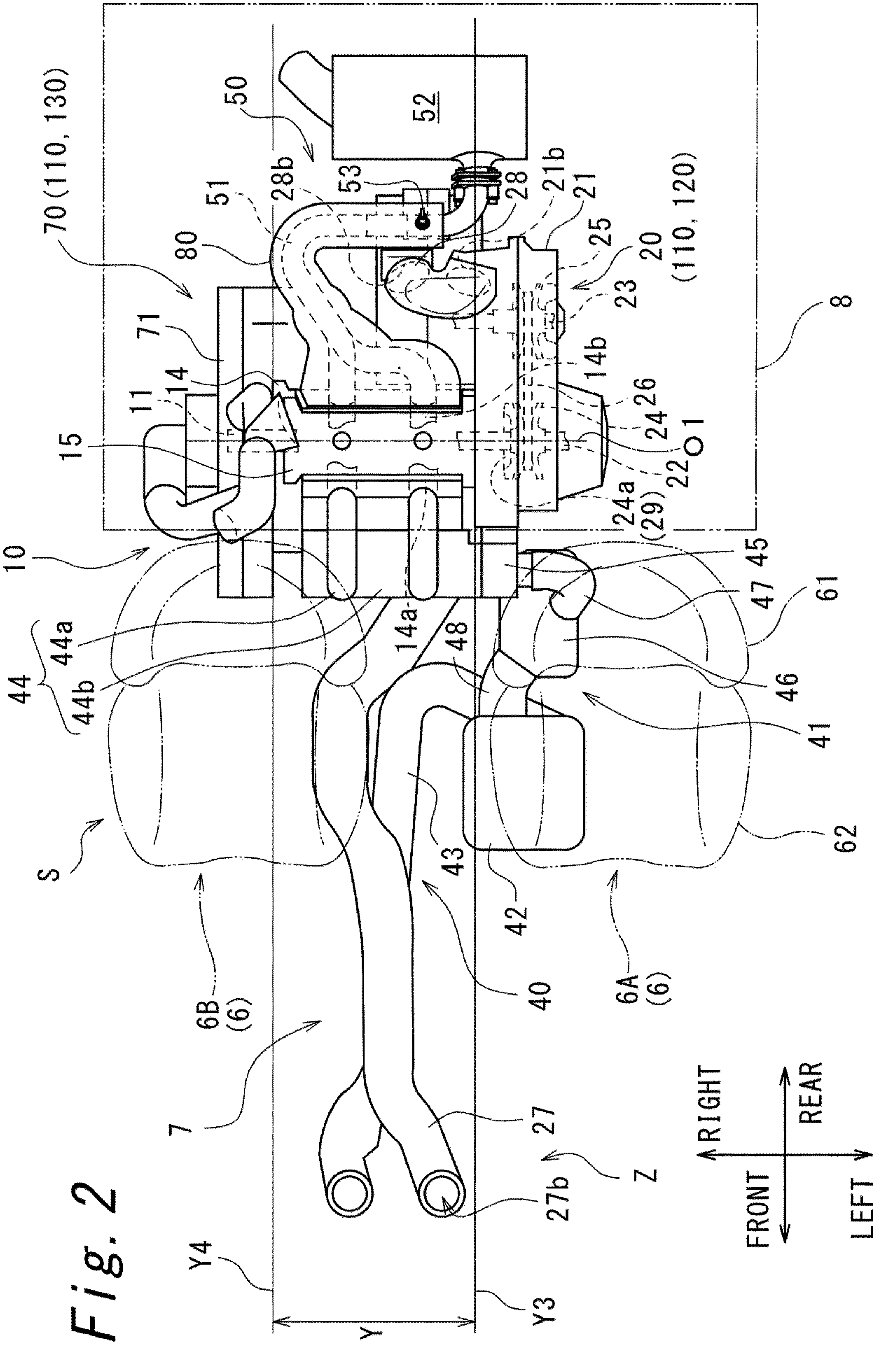
FIG. 2 is a top view schematically illustrating a powertrain mechanism.

A seat 6 is disposed in the riding space S. FIG. 2 is a top view of the powertrain mechanism 7. In FIG. 2, the seat 6 and a cargo bed 8 are both shown by a chain double-dashed line. As illustrated in FIG. 2, the seat 6 includes a driver's seat 6A located on the left side of the riding space S and a passenger seat 6B located on the right side of the riding space S. The seat 6 includes a seat back 61 that supports the back of an occupant from behind, and a seat cushion 62 on which an occupant is seated. The cargo bed 8 is located behind the seat 6 of a vehicle body 1. The cargo bed 8 is supported from below by the vehicle body frame 2 (see FIG. 1). As illustrated in FIG. 1, the powertrain mechanism 7 is arranged below the cargo bed 8. The powertrain mechanism 7 includes an engine 10, a CVT (Continuously Variable Transmission) 20, and a transmission 30. In the vehicle 100, the rotational torque output from the engine 10 is changed in rotation speed by the CVT 20 and the transmission 30 and transmitted to a front wheel 3 and a rear wheel 4.

Hereinafter, the powertrain mechanism 7 will be described. As illustrated in FIG. 2, the powertrain mechanism 7 further includes an intake system 40, an exhaust system 50, and an engine auxiliary unit 70.

In the powertrain mechanisms 7, the CVT 20 and the engine auxiliary unit 70 constitute a power transmission unit 110 in which the power is transmitted from the engine 10. Further, the CVT 20 constitutes a driving force transmission unit 120 in which the power is transmitted from the engine 10 as the driving force for traveling. Further, the engine auxiliary unit 70 constitutes an auxiliary transmission unit 130 in which the power from the engine 10 is transmitted as a driving force for an engine auxiliary 71 attached to the engine 10.

The engine 10 has a crankshaft 11 as an output shaft from which rotational torque is output. In the present embodiment, the engine 10 is a four-cycle in-line two cylinder engine in which a central axis O1 of the crankshaft 11 extends in a vehicle width direction. As illustrated in FIG. 1, the engine 10 has a crankcase 12, a cylinder 13, a cylinder head 14, and a cylinder head cover 15 in this order from the bottom.

The crankcase 12 rotatably supports the crankshaft 11. The cylinder 13 is coupled to the upper surface of the crankcase 12. The cylinder head 14 is coupled to the upper surface of the cylinder 13. As illustrated in FIG. 2, the cylinder head 14 has two intake ports 14*a* on the front side and two exhaust ports 14*b* on the rear side. The cylinder head cover 15 is fixed to the upper surface of the cylinder head 14.

The CVT 20 is disposed adjacent to the left side of the engine 10. The CVT 20 has a CVT housing 21 constituting an outer shell, and a CVT input shaft 22, a CVT output shaft 23, a drive pulley 24, a driven pulley 25, and an endless belt 26 accommodated inside the CVT housing 21.

The CVT input shaft 22 extends in the vehicle width direction and is connected to the crankshaft 11 so as to be able to transmit power. As illustrated in FIG. 1, the CVT output shaft 23 extends in the vehicle width direction behind and above the CVT input shaft 22. The CVT 20 extends in a direction that is inclined upward toward the rear in a side view.

As illustrated in FIG. 2, the drive pulley 24 is disposed on the CVT input shaft 22 so as to integrally rotate therewith. The driven pulley 25 is disposed on the CVT output shaft 23 so as to integrally rotate therewith. The endless belt 26 is wound over between the drive pulley 24 and the driven pulley 25. In the CVT 20, the drive rotation inputted from the crankshaft 11 is transmitted to the CVT input shaft 22, has the speed changed through the drive pulley 24, the driven pulley 25, and the endless belt 26, and is output from the CVT output shaft 23.

As illustrated in FIG. 1, a CVT housing 21 has a housing intake opening 21*a* at the front. The housing intake opening 21*a* opens forward. A CVT intake duct 27 is connected to the housing intake opening 21*a*. As illustrated in FIG. 2, the CVT housing 21 has a housing exhaust opening 21*b* at the rear. The housing exhaust opening 21*b* opens upward, more specifically, in a direction inclined forward and inward, that is, to the right side in the vehicle width direction toward the upper side. A CVT exhaust duct 28 that protrudes toward the engine 10, that is, the right side in the vehicle width direction and exhausts rearward is connected to the housing exhaust opening 21*b*.

The CVT 20 takes in outside air from the housing intake opening 21*a* into the inside of the CVT housing 21 through the CVT intake duct 27, and the inside of the CVT housing 21 is cooled by the taken-in outside air. Next, the outside air that has cooled the inside of the CVT housing 21 is discharged from the housing exhaust opening 21*b* to the outside of the CVT housing 21 through the CVT exhaust duct 28 to the exhaust system 50. In the present embodiment, a drive pulley 24 has a plurality of fins 24*a* that rotate integrally, and the fins 24*a* constitute a centrifugal fan 29. As the fan 29 rotates with the rotation of the drive pulley 24, outside air is taken in from the housing intake opening 21*a*.

The CVT intake duct 27 extends forward below the substantially center in the vehicle width direction of the seat 6 to reach a bonnet space Z located in front of the riding space S. In the present description, as illustrated in FIG. 1, the bonnet space Z is defined in the front-rear direction as a range that is in front of a dashboard 90 that delimits a front end of the riding space S and has the front end located at a front end portion of the vehicle body 1, and is defined in the vertical direction as a range in which the upper end is a bonnet 91 and the lower end is a vehicle body frame 2 and a wheel house. In the CVT intake duct 27, a proximal end portion 27*a* is connected to the housing intake opening 21*a*, and an intake opening 27*b* located at a distal end portion extending upward in the bonnet space Z is opened upward above the seat cushion 62. In other words, the intake opening 27*b* is open on the side opposite to the exhaust system 50 with respect to the engine 10, the riding space S is located between the intake opening 27*b* and the engine 10, and at least the seat 6 and the dashboard 90 are located as shielding objects between them. In this manner, the intake opening 27*b* easily takes in cold air without being affected by heat from the engine 10 and the exhaust system 50.

Figure 3:
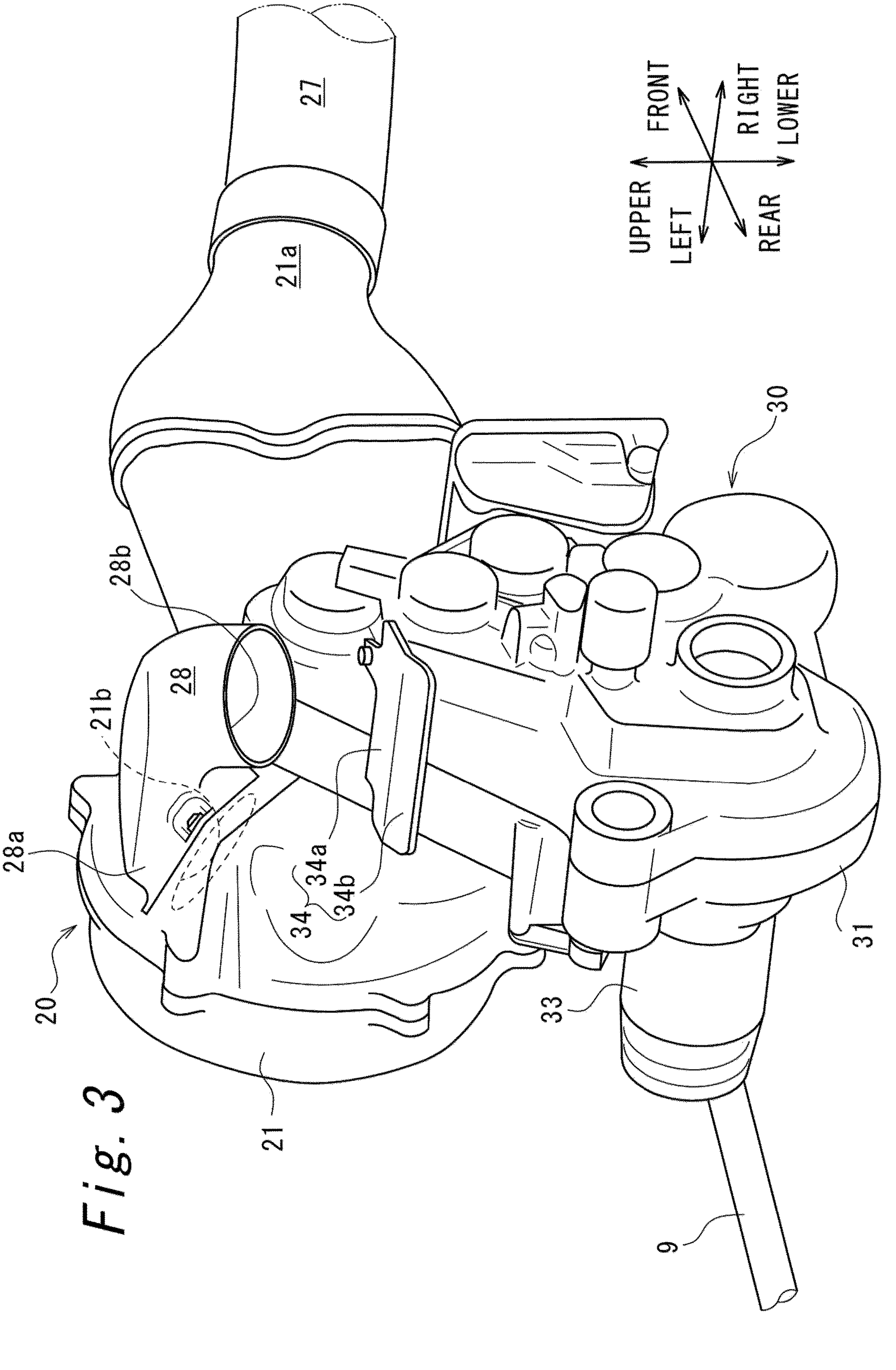
FIG. 3 is a perspective view of an area around a transmission as viewed from the rear.
Figure 6:
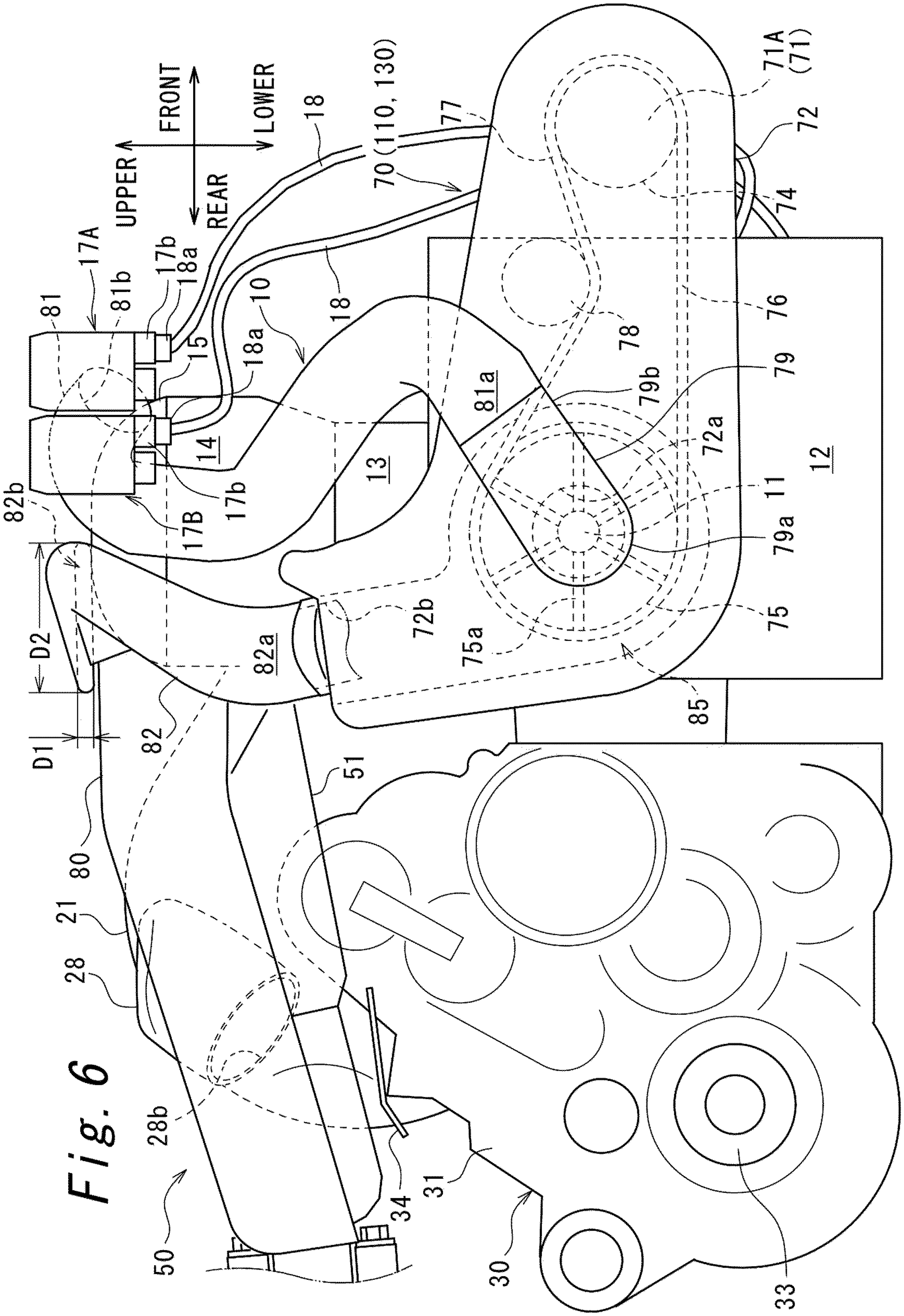
FIG. 6 is a right side view of an area around the engine.

As illustrated in FIG. 2, the CVT exhaust duct 28 projects from the CVT housing 21 in a direction to be closer to the engine 10 in the vehicle width direction. FIG. 3 is a perspective view of an area around the transmission 30 as viewed from the rear and from the inner side in the vehicle width direction. As illustrated in FIG. 3, the CVT exhaust duct 28 has a proximal end portion 28*a* connected to the housing exhaust opening 21*b*, and an exhaust opening 28*b* located at a distal end portion extending in a curved manner downward toward the inside in the vehicle width direction, and is opened in a direction inclined rearward and inward (right side) in the vehicle width direction toward the lower side above the transmission 30. As shown in FIG. 6, the CVT exhaust duct 28 is located below the upper end portion of the CVT housing 21.

As illustrated in FIG. 2, the intake opening 27*b* of the CVT intake duct 27, the fan 29, and the exhaust opening 28*b* of the CVT exhaust duct 28 constitute an air guide that guides outside air toward the exhaust system 50. Note that the exhaust opening 28*b* of the CVT exhaust duct 28 may have a dimension in the vertical direction smaller than a dimension in the horizontal direction. In this manner, outside air exhausted through the CVT exhaust duct 28 is exhausted to a wide range in the horizontal direction toward the exhaust system 50 while being throttled in the vertical direction at the exhaust opening 28*b* so that a flow velocity is increased, and the cooling performance of the exhaust system 50 can be further improved.

As shown in FIG. 1, the transmission 30 is located behind the engine 10 and adjacent to the right side of the CVT 20.

The transmission 30 includes a transmission housing 31 that constitutes an outer shell, and a transmission input shaft 32 and a transmission output shaft 33 accommodated inside the transmission housing 31.

The transmission input shaft 32 extends in the vehicle width direction in an upper front portion of the transmission housing 31, and is connected to the CVT output shaft 23 so as to be able to transmit power. That is, the transmission input shaft 32 is located above and behind the crankshaft 11. The transmission output shaft 33 extends in the vehicle width direction in a lower rear portion of the transmission housing 31. That is, the transmission output shaft 33 is located below and behind the transmission input shaft 32. In the transmission 30, the drive rotation inputted from the CVT output shaft 23 is transmitted to the transmission input shaft 32, has the rotation speed changed, and is outputted from the transmission output shaft 33.

As illustrated in FIG. 3, a drive shaft 9 for driving the rear wheel 4 is connected to the transmission output shaft 33. An upper portion of the transmission housing 31 is inclined downward toward the rear.

The transmission 30 further includes a baffle plate (wind guiding plate) 34. The baffle plate 34 is attached to the upper portion of the transmission housing 31. More specifically, the baffle plate 34 is located below the exhaust opening 28*b* of the CVT exhaust duct 28 on an upper portion of the transmission housing 31. That is, the exhaust opening 28*b* of the CVT exhaust duct 28 faces the baffle plate 34 from above. The baffle plate 34 has a first surface portion 34*a* extending in the horizontal direction and a second surface portion 34*b* extending in a direction inclined downward toward the rear in a manner continuous with a rear edge of the first surface portion 34*a*.

The baffle plate 34 receives the air discharged from the CVT exhaust duct 28 on the first surface portion 34*a* and guides the air rearward via the second surface portion 34*b*. As will be described later, the exhaust system 50 is located behind the baffle plate 34, and the exhaust system 50 is cooled by the air guided by the baffle plate 34. Note that the baffle plate 34 is not necessarily required, and the direction of the exhaust opening 28*b* of the CVT exhaust duct 28 may be set such that discharged air is directly supplied toward the exhaust system 50.

As illustrated in FIG. 2, the intake system 40 has an intake pipe 41, an air cleaner 42, and an engine intake duct 43. The intake pipe 41 has an intake manifold 44, a throttle body 45, and an air box 46 in this order from the downstream side of the intake path.

The intake manifold 44 has, on the downstream side, two independent port portions 44*a* connected to the intake ports 14*a* of the cylinder head 14 and has, on the upstream side, a collecting port portion 44*b* in which the independent port portion 44*a* are integrated into one. As illustrated in FIG. 1, the independent port portion 44*a* extends in a direction inclined downward toward the rear. Referring back to FIG. 2, the collecting port portion 44*b* extends in the left-right direction in an upstream side end portion (front end in the diagram) of the independent port portions 44*a*. The collecting port portion 44*b* has an entrance in a left end portion.

The throttle body 45 is connected to the left side of the intake manifold 44. Specifically, the throttle body 45 is connected to a left end portion of the collecting port portion 44*b* of the intake manifold 44. In the present embodiment, the throttle body 45 adjusts the amount of air flowing into the engine 10 by being electronically controlled, and thereby the rotation speed of the engine 10 is controlled.

The air box 46 is disposed below the front of the throttle body 45 and below a seat back 61 of the driver's seat 6A. The air box 46 is connected to left side of the throttle body 45 with an air pipe 47 interposed between them. The air box 46 acts as a resonator that reduces intake noise in the intake system 40 or a surge tank that suppresses a sudden fluctuation in the amount of air flowing into the engine 10.

The air cleaner 42 is connected to the air box 46 with an air pipe 48 interposed between them. The air cleaner 42 is disposed below the seat 6 on the front side of the engine 10 with space between them. Specifically, the air cleaner 42 is disposed below a seat cushion 62 of the driver's seat 6A. More specifically, the air cleaner 42, in top view, has at least the left half overlapping the seat cushion 62 of the driver's seat 6A.

As shown in FIG. 1, in the vertical direction, an upper end portion of the air cleaner 42 is located below an upper end portion of the cylinder head 14. Specifically, the upper end portion of the air cleaner 42 is located at substantially the same height as a straight line W1 that passes through a lower end portion of the cylinder head 14 and extends horizontally in the front-rear direction. Further, as shown in FIG. 2, in the left-right direction, the air cleaner 42 has a left end portion located on the left side of the engine 10 and further on the right side than a left end portion of the CVT 20, and a right end portion located further on the right side than a left end portion of the engine 10.

As illustrated in FIG. 1, a downstream side end portion of the engine intake duct 43 is connected to the lower rear end of the left side surface of the air cleaner 42. As illustrated in FIG. 2, the engine intake duct 43 extends below the seat 6 to the right, curves forward below the substantial center in the vehicle width direction of the seat 6, and extends forward below the CVT intake duct 27 to reach the bonnet space Z. The front opening tip of the engine intake duct 43 extends upward and opens upward on the right side of the intake opening 27*b* of the CVT intake duct 27 in the bonnet space Z. However, the positional relationship between the opening tips is not limited to one in the present embodiment.

In the intake system 40, the intake air taken in through the engine intake duct 43 is filtered by the air cleaner 42 and then reaches the throttle body 45 via the air box 46. In the throttle body 45, the intake air is adjusted to the air flow rate according to the output required by the engine 10 and reaches the intake manifold 44. In the intake manifold 44, the intake air is distributed from the collecting port portion 44*b* to the independent port portions 44*a* and introduced into the intake ports 14*a*.

Figure 4:
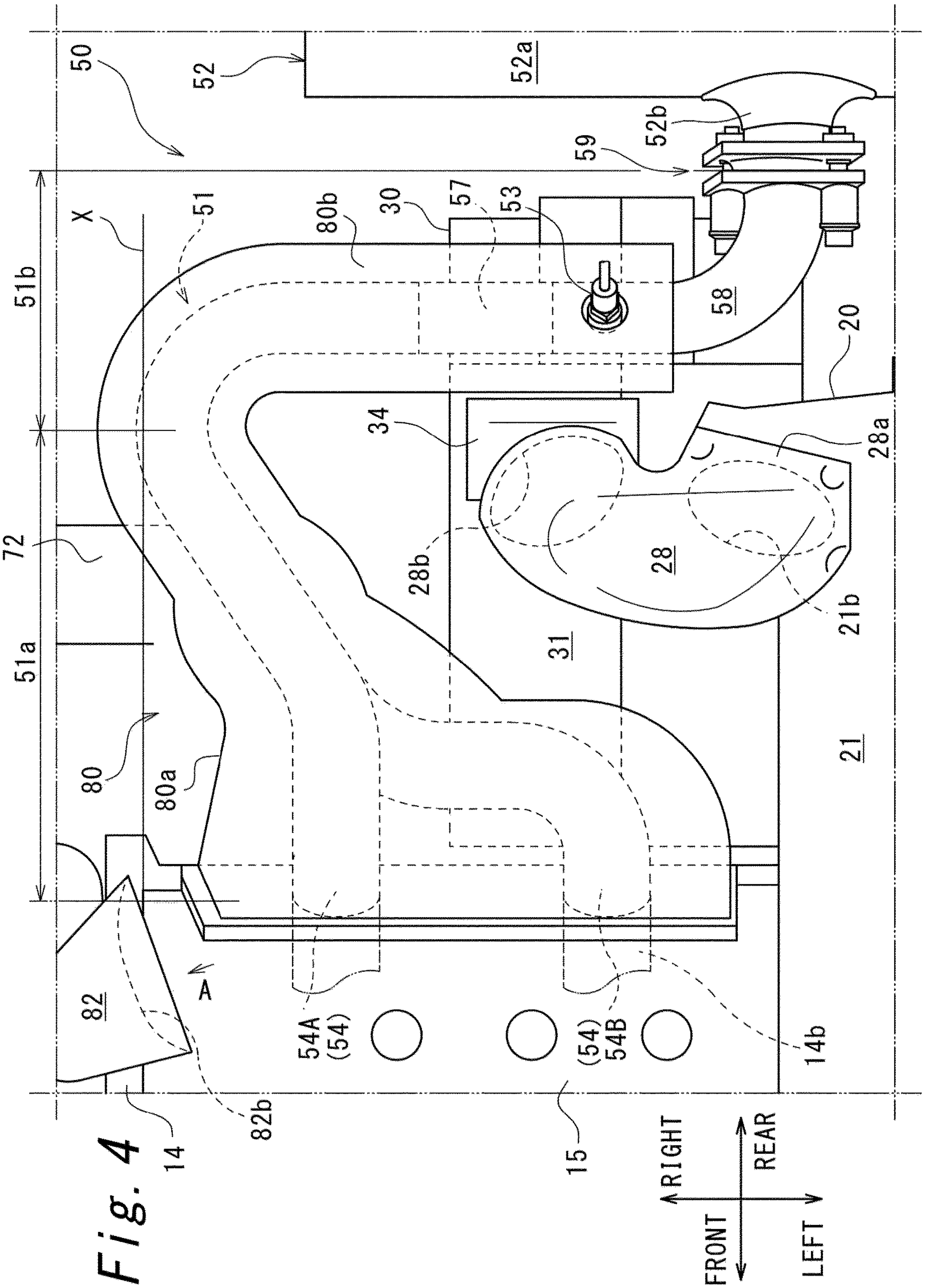
FIG. 4 is an enlarged view of an area around an exhaust pipe in FIG. 2.

FIG. 4 is a top view illustrating an area around an exhaust pipe 51 in an enlarged manner in the powertrain mechanism 7. As shown in FIG. 4, the exhaust system 50 includes the exhaust pipe 51, an exhaust muffler 52, and an exhaust gas sensor 53. The exhaust pipe 51 includes, in order from the upstream side, two independent exhaust pipes 54, one collecting pipe 57, and one exhaust pipe 58. Furthermore, the exhaust system 50 includes a heat cover 80 that covers substantially the entire periphery of the exhaust pipe 51 from above. The heat cover 80 has a first portion 80*a* covering a portion around the independent exhaust pipe 54 from above, and a second portion 80*b* covering a portion around the collecting pipe 57 and the exhaust pipe 58 from above. The heat cover 80 has a planar upper surface extending in a substantially horizontal direction over the two independent exhaust pipes 54 so as to cover the two independent exhaust pipes 54 of the first portion 80*a* from above.

The two independent exhaust pipes 54 are connected to the two exhaust ports 14*b* of the cylinder head 14. The two independent exhaust pipes 54 include a first independent exhaust pipe 54A and a second independent exhaust pipe 54B arranged in order from the right side. The second independent exhaust pipe 54B is connected to the exhaust port 14*b* located on the side closest to the CVT 20 among the two exhaust ports 14*b*, and constitutes a CVT side exhaust pipe.

Figure 5:
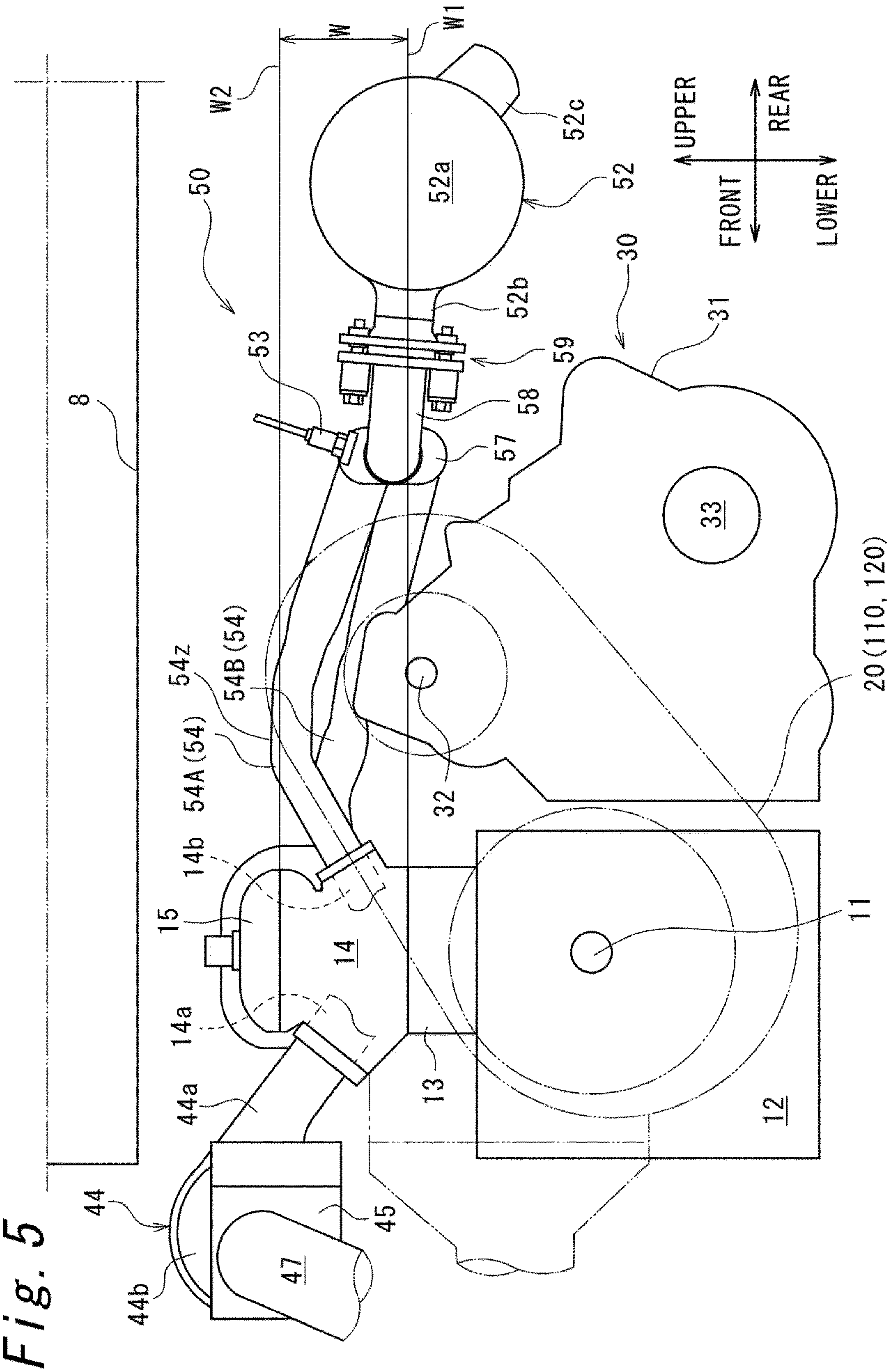
FIG. 5 is an enlarged view of an area around an engine in FIG. 1.

FIG. 5 is a left side view illustrating an area around the exhaust system 50 in the powertrain mechanism 7. Note that, in FIG. 5, the CVT 20 is indicated by a chain double-dashed line, and the heat cover 80 is omitted. As illustrated in FIG. 5, the first independent exhaust pipe 54A extends in a direction inclined upward toward the rear, and has a top portion 54*z* in a substantially central portion in the front-rear direction.

The first independent exhaust pipe 54A extends toward the rear side from the exhaust port 14*b*. The second independent exhaust pipe 54B curves to the right toward the rear side from the exhaust port 14*b*. Specifically, the second independent exhaust pipe 54B curves approximately at right angles to the opposite side to the CVT 20, that is, to the right, immediately after extending to the rear side from an end portion connected to the exhaust port 14*b*.

The second independent exhaust pipe 54B is adjacent to the right side of an upper end portion of the transmission 30.

Each of the first independent exhaust pipe 54A and the second independent exhaust pipe 54B extends to the rear side in a direction inclined rightward, then curves leftward, extends leftward substantially in parallel with the vehicle width direction, and is connected to an upstream side end portion of the collecting pipe 57.

The collecting pipe 57 is located in the direction in which the exhaust opening 28*b* of the CVT exhaust duct 28 is directed. As a result, air discharged from the CVT exhaust duct 28 is guided by the baffle plate 34 and supplied to the second portion 80*b* of the heat cover 80 covering a portion around the second collecting pipe 57. A temperature of the collecting pipe 57 is likely to rise as the first independent exhaust pipe 54A and the second independent exhaust pipe 54B gather, and, for this reason, a surface temperature of the second portion 80*b* of the heat cover 80 is likely to rise. However, the temperature rise is effectively reduced by outside air discharged from the CVT 20. In this manner, heat transfer of temperature from the exhaust system 50 to the cargo bed 8 is suppressed.

The exhaust pipe 58 is connected to a downstream side end portion of the collecting pipe 57. The exhaust pipe 58 extends to the left side substantially parallel to the vehicle width direction from a downstream side end portion of the second collecting pipe 57, then curves rearward behind a left end portion of the engine 10, and is connected to an upstream side end portion of the exhaust muffler 52 with a spherical joint 59 interposed between them. The exhaust gas sensor 53 is attached to an upstream side portion of the exhaust pipe 58.

As described above, the exhaust pipe 51 curves to the right toward the rear, then extends to the rear of a right end portion of the engine 10, curves to the left, and extends to the rear of a left end portion of the engine 10. As a whole, the exhaust pipe 51 extends in a substantially S-shape. Among the exhaust pipe 51, a portion located on the upstream side and extending to the right toward the rear constitutes an upstream side exhaust pipe 51*a*, and a portion connected to a rear end portion of the upstream side exhaust pipe 51*a* and extending to the left side toward the rear constitutes a downstream side exhaust pipe 51*b*. In other words, the upstream side exhaust pipe 51*a* is a front half portion of the exhaust pipe 51. The downstream side exhaust pipe 51*b* is a rear half portion of the exhaust pipe 51.

That is, in the present embodiment, the upstream side exhaust pipe 51*a* includes a portion that extends in a direction inclined to the right side toward the rear side and is located on the far right in two independent exhaust pipes 54. Further, the downstream side exhaust pipe 51*b* includes a portion extending substantially parallel to the vehicle width direction by curving to the left toward the rear side in a manner continuous with a downstream side end portion of the upstream side exhaust pipe 51*a* of the two independent exhaust pipes 54, the collecting pipe 57, and the exhaust pipe 58.

The upstream side exhaust pipe 51*a* has, in the top view, a portion that passes through a region that is further on the right than a straight line X extending in the front-rear direction through a right end portion of the cylinder head cover 15, and is located further on the left than a right end portion of an auxiliary case 72 described later.

As illustrated in FIG. 5, the exhaust muffler 52 has a cylindrical muffler main body 52*a* extending in the vehicle width direction, the muffler inlet portion 52*b* protruding forward at a left end portion, and a tail pipe 52*c* protruding rightward from a right end portion and curves rearward. The muffler inlet portion 52*b* constitutes a connection portion connected to a downstream side end portion of the exhaust pipe 51. In other words, in the exhaust system 50, the exhaust pipe 51 and the exhaust muffler 52 are disposed so as to be side by side in the front-rear direction, do not overlap in the vertical direction, and are different in position in the front-rear direction.

Here, the exhaust system 50 is disposed at substantially the same height as the cylinder head 14 in the vertical direction. Specifically, the exhaust pipe 51 is generally located in a region W where the cylinder head 14 is projected rearward. The region W is defined as a region in the vertical direction between the straight line W1 that passes through a lower end portion of the cylinder head 14 and extends to the rear and a straight line W2 that passes through an upper end portion of the cylinder head 14 and extends to the rear. In the vertical direction, the top portion 54*z* that is highest of the exhaust pipe 51 is located at substantially the same height as the straight line W2. Further, an upper end portion of the exhaust muffler 52 is located at substantially the same height as the straight line W2 in the vertical direction.

As illustrated in FIG. 2, in the left-right direction, the engine auxiliary unit 70 is disposed adjacent to the side opposite to the CVT 20 of the engine 10, that is, on the right side. FIG. 6 is a right side view illustrating an area around the engine 10. As shown in FIG. 6, the engine auxiliary unit 70 has an engine auxiliary 71 and an auxiliary case 72 that accommodates the engine auxiliary 71. The auxiliary case 72 covers the engine auxiliary 71 accommodated inside from the outer side in the vehicle width direction, which prevents a foreign matter such as water or sand from directly splashing on the engine auxiliary 71.

The engine auxiliary 71 includes an air conditioner compressor 71A arranged in front of the engine 10. The air conditioner compressor 71A includes a driven pulley 74 at a right end portion. Further, inside the auxiliary case 72, a drive pulley 75 fixed to a right end portion of the crankshaft 11, a first belt 76 wound over between the drive pulley 75 and the driven pulley 74, and a tensioner 78 that adjusts the tension of the first belt 76 are disposed.

Therefore, the air conditioner compressor 71A is rotationally driven as the crankshaft 11 rotates.

An auxiliary case 72 has a case intake opening 72*a* that opens to the right on a side wall portion and a case exhaust opening 72*b* that opens upward on an upper wall portion. Specifically, the case intake opening 72*a* faces a right end portion of a crankshaft 11*a*. The case exhaust opening 72*b* is located corresponding to a rear surface of a cylinder head 14 in the front-rear direction. A case intake duct 81 is connected to the case intake opening 72*a* via an intake fitting 79. A case exhaust duct 82 is connected to the case exhaust opening 72*b*.

The intake fitting 79 includes a proximal end portion 79*a* connected to the case intake opening 72*a*, and a distal end portion 79*b* bent 90° from the proximal end portion 79*a* and extending in a direction inclined upward toward the front.

The case intake duct 81 has a proximal end portion 81*a* connected to the distal end portion 79*b* of the intake fitting 79, and has an intake opening 81*b* at a distal end portion extending upward in an S shape from the proximal end portion 81*a*. The intake opening 81*b* opens in a direction inclined downward toward the front on the front side of the engine 10, on the rear side of the seat back 61, and above the seat cushion 62. In other words, the intake opening 81*b* opens to the side opposite to the exhaust system 50 with respect to the engine 10. In the present embodiment, a drive pulley 75 has a plurality of fins 75*a* that rotate integrally, and the fins 75*a* constitute a centrifugal fan 85. When the fan 85 rotates with the rotation of the drive pulley 75, outside air is taken into the inside of the auxiliary case 72 from the case intake duct 81.

The case exhaust duct 82 has a proximal end portion 82*a* connected to the case exhaust opening 72*b*, has a top portion bent from the proximal end portion 82*a* and extending in a direction inclined to the front toward the upper side is bent leftward, and has an exhaust opening 82*b* at a distal end portion. The exhaust opening 82*b* is open above the engine 10 in a direction inclined backward from the right front side to the lower side with respect to the first portion 80*a* of the heat cover 80, that is, the exhaust pipe 51. Specifically, the case exhaust duct 82 opens from the right front side toward the first portion 80*a* of the heat cover 80. The first portion 80*a* of the heat cover 80 is effectively cooled by air discharged from the case exhaust duct 82. As the first portion 80*a* of the heat cover 80 is cooled, the independent exhaust pipe 54 and the first collecting pipe 55 located inside the first portion 80*a* are also cooled indirectly. Furthermore, since outside air is supplied to the heat cover 80 from the front, not only the first portion 80*a* but also the second portion 80*b* located on the downstream side are cooled, and the exhaust pipe 51 located inside the second portion 80*b* is also cooled. This also suppresses the heat transfer of temperature from the exhaust system 50 to the cargo bed 8. Furthermore, as described above, although an upper surface of the first portion 80*a* of the heat cover 80 is formed in a planar shape, deposition of foreign materials on the first portion 80*a* is effectively suppressed by outside air discharged from the case exhaust duct 82.

Figure 7:
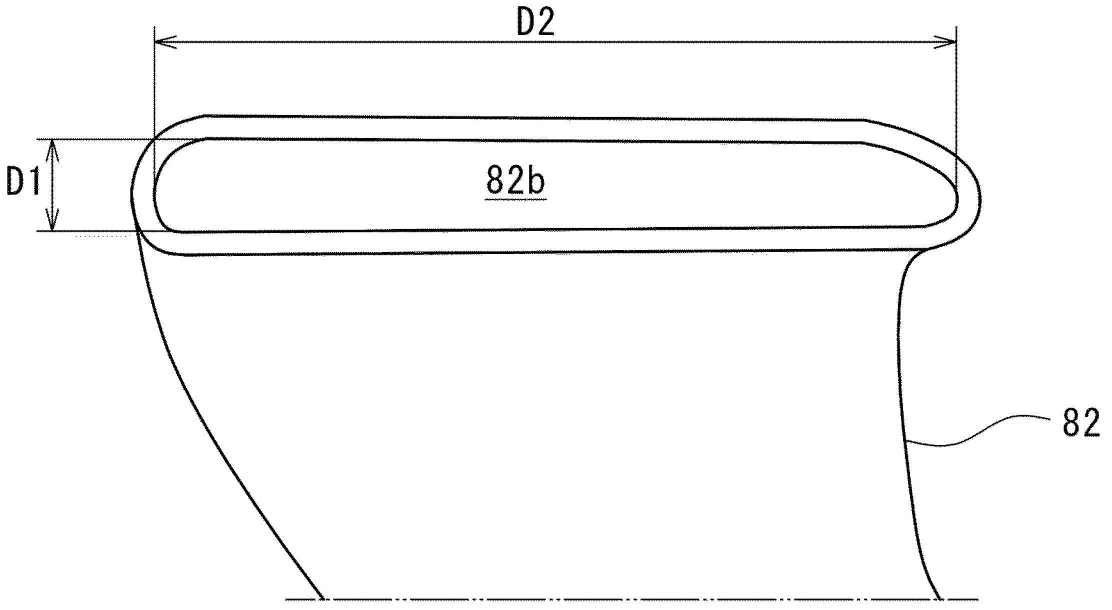
FIG. 7 is a front view of an exhaust opening of a case exhaust duct as viewed in a direction of arrow A in FIG. 4.

FIG. 7 is a front view of the exhaust opening 82*b* of the case exhaust duct 82 as viewed in a direction of arrow A in FIG. 4. As illustrated in FIG. 7, in the exhaust opening 82*b* of the case exhaust duct 82, a dimension D1 in the vertical direction is smaller than a dimension D2 in the horizontal direction. In this manner, outside air discharged through the case exhaust duct 82 is throttled in the vertical direction at the exhaust opening 82*b* so that a flow velocity is increased, and is discharged to a wide range in the horizontal direction toward the heat cover 80.

Therefore, the intake opening 81*b* of the case intake duct 81, the fan 85, and the exhaust opening 82*b* of the case exhaust duct 82 constitute the air guide that guides outside air toward the exhaust system 50, particularly, the exhaust pipe 51 and the heat cover 80.

Figure 8:
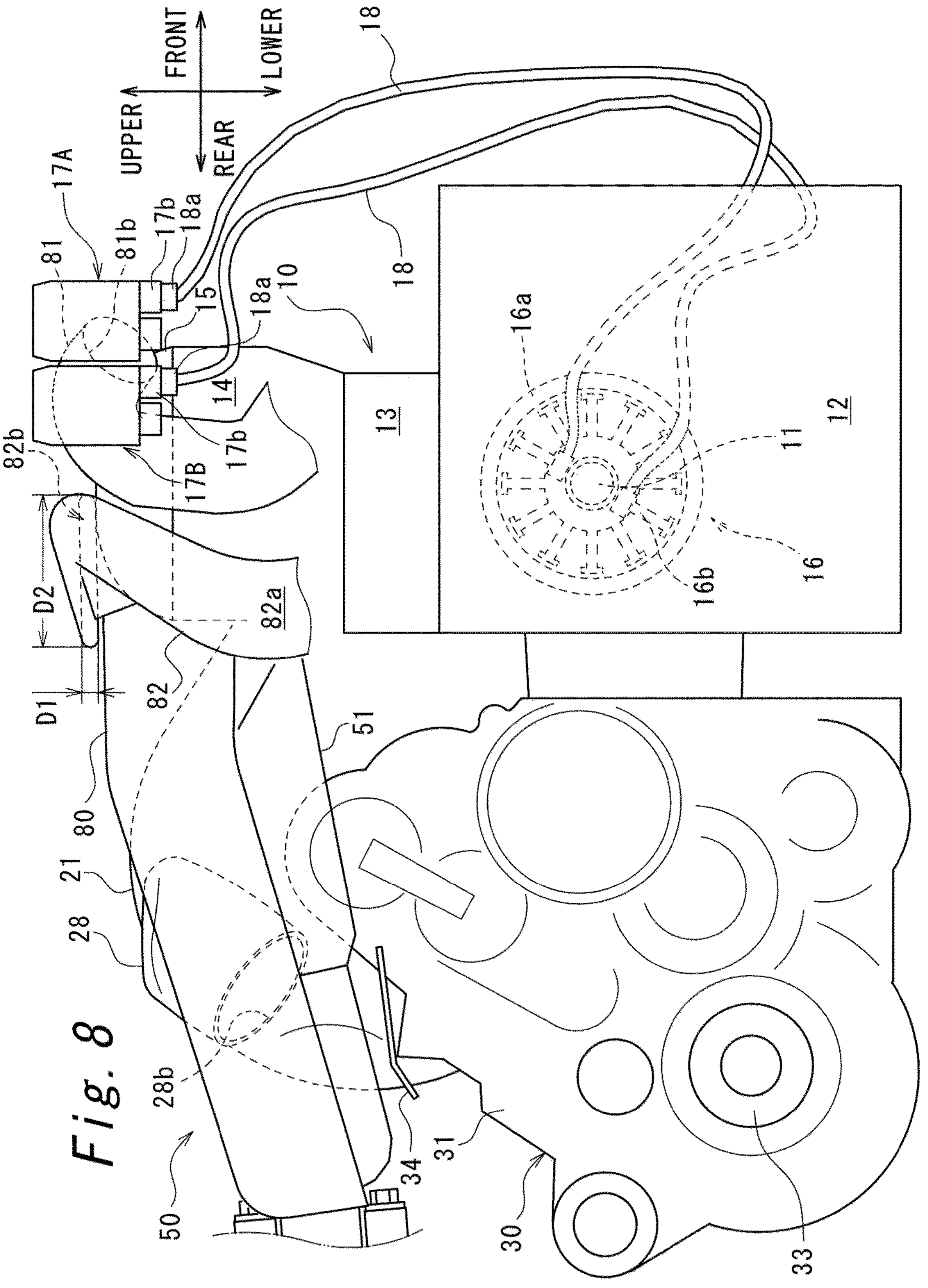
FIG. 8 is a right side view of an area around the engine.

FIG. 8 is a right side view illustrating an area around the engine 10. In FIG. 8, the engine auxiliary unit 70 is omitted. As illustrated in FIG. 8, the powertrain mechanism 7 includes a generator 16, two regulators 17A and 17B, and a wiring 18.

The generator 16 is accommodated in the crankcase 12. The generator 16 includes a rotor 16*a* fixed to the crankshaft 11 and a stator 16*b* disposed on the inner peripheral side of the rotor 16*a*. The generator 16 is rotationally driven as the crankshaft 11 rotate to generate electric power. Specifically, when the rotor 16*a* is rotationally driven as the crankshaft 11 rotates, current flows through a stator coil of the stator 16*b*.

Each regulator 17 is electrically connected to the generator 16 via the wiring 18. The regulator 17 controls voltage of power generated by the generator 16. The regulator 17 of the present embodiment is an example of a heat generating component according to the present disclosure.

Figure 9:
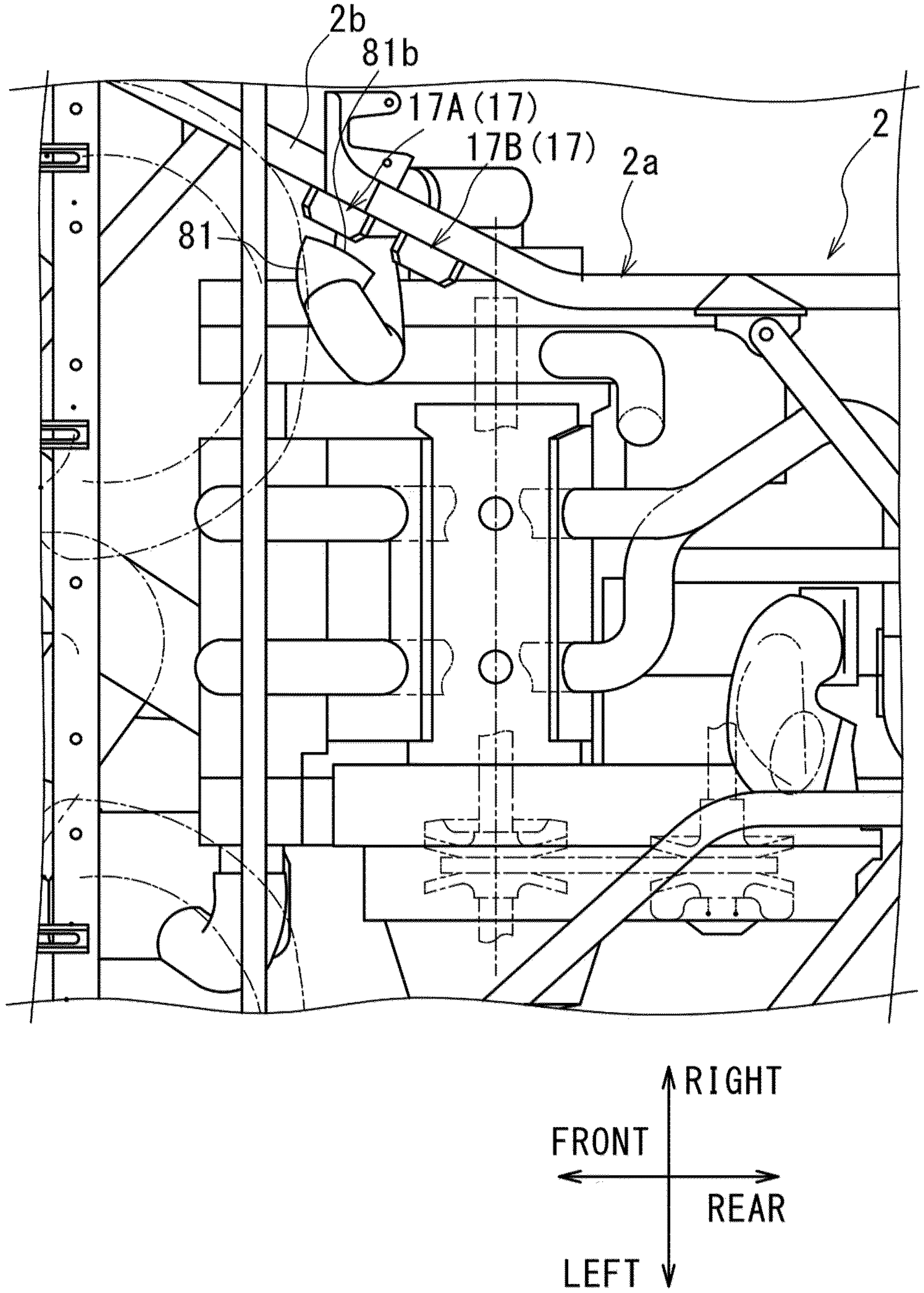
FIG. 9 is a top view of an area around the engine.

The regulator 17 is disposed away from the generator 16. Specifically, the regulator 17 is disposed outside the crankcase 12. FIG. 9 is a top view illustrating an area around the engine 10. As illustrated in FIG. 9, the regulator 17 is attached to a support frame 2*a* of the vehicle body frame 2 that supports the cargo bed 8 (illustrated in FIG. 2) from below and extends in the front-rear direction. More specifically, the regulator 17 is disposed on the inner side in the vehicle width direction of an inclined portion 2*b* of the support frame 2*a* that extends to the outer side in the vehicle width direction toward the rear side. Therefore, the regulator 17 is disposed below the cargo bed 8 and on the inner side in the vehicle width direction of the support frame 2*a*. By the above, the regulator 17 is disposed at a position that is not hit by traveling wind when the vehicle 100 travels.

The regulator 17 generates heat during driving of the engine 10. The regulator 17 is provided with a heat sink 17*a* (see FIG. 10) for heat dissipation.

The wiring 18 electrically connects the generator 16 to the regulator 17. As illustrated in FIG. 8, the wiring 18 has a terminal 18*a* connected to the regulator 17. The wiring 18 is connected to the regulator 17 as the terminal 18*a* is inserted into a terminal connection portion 17*b* of the regulator 17.

Figure 10:
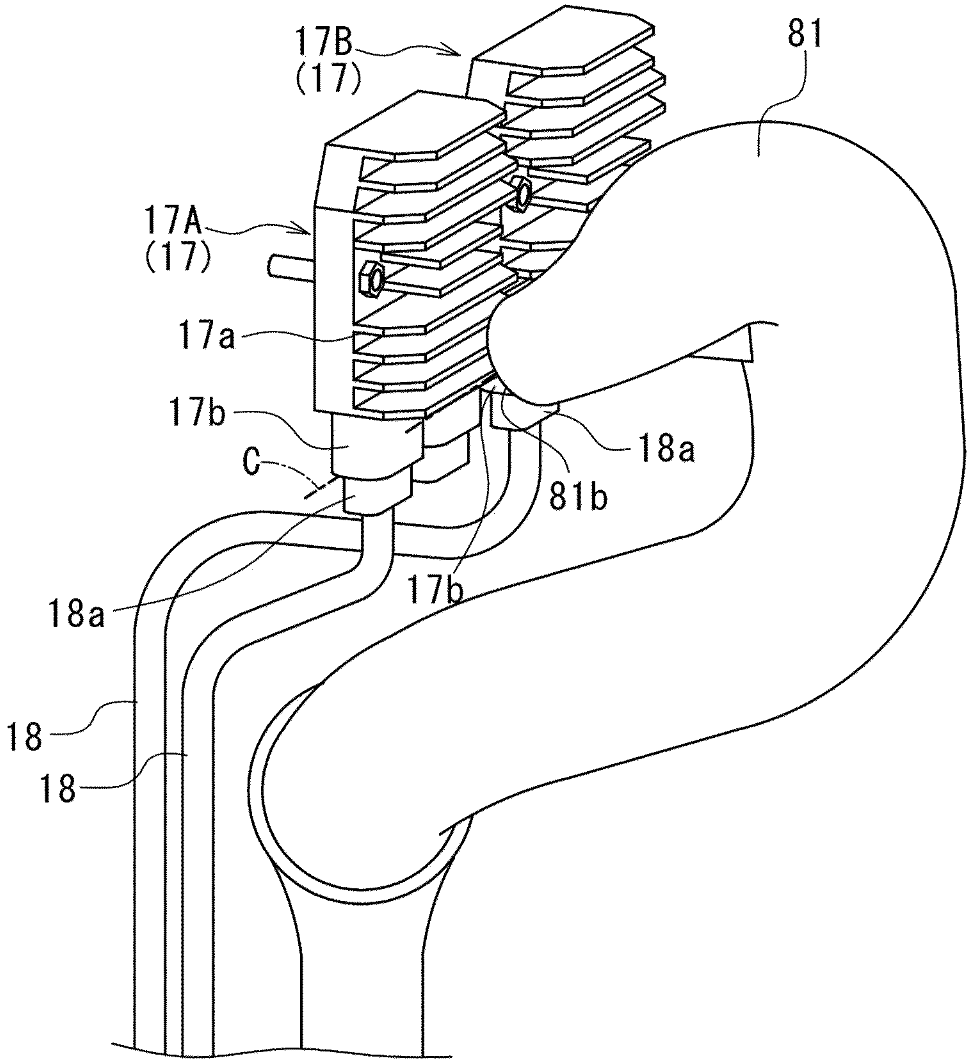
FIG. 10 is a perspective view of an area around an intake opening of a case intake duct.
Figure 11:
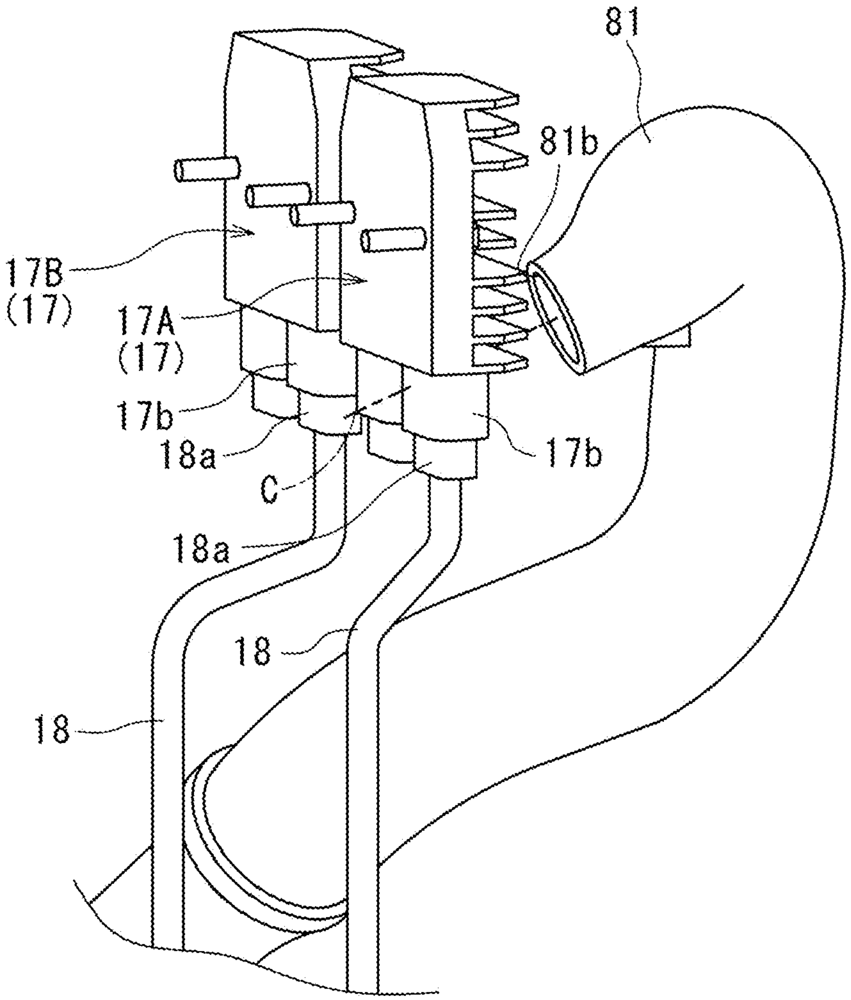
FIG. 11 is a perspective view of an area around the intake opening of the case intake duct.

FIGS. 10 and 11 are perspective views of an area around the intake opening 81*b* of the case intake duct 81. As illustrated in FIGS. 8 to 11, the intake opening 81*b* is disposed facing the regulator 17. The intake opening 81*b* opens in the left-right direction. Specifically, the intake opening 81*b* opens in a direction inclined downward and forward toward the outer side in the vehicle width direction. The intake opening 81*b* and the regulator 17 are arranged side by side in the left-right direction, and are arranged to overlap in the front-rear direction and the vertical direction.

As illustrated in FIGS. 10 and 11, the intake opening 81*b* faces the terminal connection portion 17*b* of the regulator 17. Specifically, the terminal connection portion 17*b* of the regulator 17 is disposed on an axis C of the intake opening 81*b*. The axis C of the intake opening 81*b* passes through the center of the intake opening 81*b* in the diagram and extends along a direction in which the intake opening 81*b* opens. That is, the axis C of the intake opening 81*b* extends in a manner inclined downward and forward toward the outer side in the vehicle width direction.

Since the intake opening 81*b* of the case intake duct 81 faces the regulator 17, particularly the terminal connection portion 17*b*, air around the regulator 17, particularly the terminal connection portion 17*b* is drawn into the intake opening 81*b*. This improves heat dissipation of the regulator 17, particularly the terminal connection portion 17*b*.

Here, as illustrated in FIG. 1, in the powertrain mechanism 7 according to the present embodiment, at least a part of each of the transmission 30, the air cleaner 42, the exhaust pipe 51, and the exhaust muffler 52 is disposed within a region Y in which the engine 10 is projected in the front-rear direction.

The region Y has an upper end portion constituted by a horizontal plane Y1 passing through an upper end portion of the cylinder head cover 15, and has a lower end portion constituted by a horizontal plane Y2 passing through a lower end portion of the crankcase 12. Further, as shown in FIG. 2, the region Y has a left end portion constituted by an extending surface Y3 that passes through a left end portion of the engine 10 and extends in the front-rear direction, and a right end portion constituted by a vertical plane Y4 that passes through a right end portion of the engine 10 and extends in the front-rear direction. Note that, in a case where an additional part such as an oil pan is mounted on a lower end portion of the crankcase 12, the horizontal plane Y2 is defined by a horizontal plane passing through a lower end portion of the additional part.

According to the vehicle 100 according to the embodiment described above, an effect described below is achieved.

(1) Since the intake opening 81*b* faces the regulator 17, air around the regulator 17 is drawn into the intake opening 81*b*. As a result, it is easy to improve heat dissipation of the regulator 17. Furthermore, outside air drawn into the intake opening 81*b* after flowing around the regulator 17 is guided by the air guide, so that the exhaust pipe 51 is cooled. This allows outside air drawn into the air guide for cooling the exhaust pipe 51 to be used for cooling the regulator 17. In other words, it is possible to cool the exhaust pipe 51 by using outside air discharged from the air guide after cooling the regulator 17.

(2) A rated upper limit temperature of a general regulator is at most about 150° C., which is significantly lower than an exhaust temperature of a general engine. For this reason, the exhaust pipe 51 can be effectively cooled also by outside air taken in from around the regulator 17.

(3) The intake opening 81*b* faces the terminal connection portion 17*b*, the temperature of which is particularly likely to rise, in the regulator 17. As a result, the regulator 17 can be effectively cooled.

(4) Since a space on the inner side in the vehicle width direction of the support frame 2*a* that supports the cargo bed 8 is surrounded by the cargo bed 8 and the support frame 2*a*, heat is likely to be accumulated. In a case where the regulator 17 that generates heat during driving of the engine 10 is disposed in a space where heat is likely to be accumulated as in the present embodiment, the regulator 17 can be cooled by the air guide.

(5) In a case where the regulator 17 is cooled using traveling wind, it is necessary to arrange the regulator 17 at a position hit by traveling wind. For example, in a case where the regulator 17 is arranged on an exterior of the vehicle 100, a distance between the generator 16 and the regulator 17 becomes long, and thus, it is necessary to lengthen the wiring 18 connecting the generator 16 to the regulator 17. On the other hand, by disposing the regulator 17 at a position not exposed to traveling wind as in the present embodiment, the degree of freedom of arrangement of the regulator 17 is improved as compared with a case where the regulator 17 is arranged at a position exposed to traveling wind. For this reason, in a case where the regulator 17 is arranged at a position close to the generator 16 and not exposed to traveling wind, it is possible to prevent the wiring 18 connecting the generator 17 to the regulator 16 from becoming long. Further, in a case where the regulator 17 is arranged at a position not exposed to traveling wind, it is easy to ensure cooling performance of the regulator 17 by the air guide.

Further, the utility vehicle 100 according to the embodiment described above exerts an effect below in addition to the above effect produced by the air guide.

(a) The intake opening 27*b* of the CVT intake duct 27, the fan 29, and the exhaust opening 28*b* of the CVT exhaust duct 28 constitute the air guide that guides outside air toward the exhaust system 50, particularly, the exhaust pipe 51 and the heat cover 80. Similarly, the intake opening 81*b* of the case intake duct 81, the fan 85, and the exhaust opening 82*b* of the case exhaust duct 82 constitute the air guide that guides outside air toward the exhaust system 50, particularly, the exhaust pipe 51 and the heat cover 80. As a result, since the exhaust pipe 51 and the heat cover 80 are cooled by outside air guided from the air guide, heat damage due to the exhaust pipe 51 to the surroundings thereof is suppressed. In particular, since the exhaust system 51 located on the upstream side of the exhaust muffler 52 is cooled, the exhaust system 51 can be more effectively cooled, and the heat damage to the surroundings of the exhaust system 51 is more effectively suppressed. Furthermore, a deposit that may be deposited on the heat cover 80 is blown off and removed by outside air guided from the air guide.

(b) The heat cover 80 that covers the periphery of the exhaust pipe 51 is arranged on the exhaust pipe 51. Even in a case where the exhaust pipe 51 is covered with the heat cover 80, deposition of foreign materials on the heat cover 80 is effectively suppressed by outside air supplied from the air guide toward the heat cover 80.

(c) The engine 10 includes the cylinder head 14 having a plurality of exhaust ports 14*b*, and the exhaust pipe 51 has a plurality of the independent exhaust pipes 54 connected to a plurality of the exhaust ports 14*b*, the collecting pipe 57, and the exhaust pipe 58. As a result, the above effect is suitably exhibited in the exhaust pipe 51 that is directly connected to the engine 10 and tends to have a relatively high temperature as compared with the exhaust muffler 52.

(d) In the CVT 20, the air guide includes the intake opening 27*b* into which outside air is introduced, the fan 29 that draws outside air into the intake opening 27*b*, and the exhaust opening 28*b* through which outside air drawn by the fan 29 is discharged toward the exhaust pipe 51 and the heat cover 80. Further, in the engine auxiliary unit 70, the air guide includes the intake opening 81*b* through which outside air is introduced, the fan 85 that draws outside air into the intake opening 81*b*, and the exhaust opening 82*b* through which outside air drawn by the fan 85 is discharged toward the exhaust pipe 51 and the heat cover 80. As a result, the air guide can be easily configured using outside air that is discharged after cooling the inside of the CVT 20 and the engine auxiliary unit 70.

(e) The engine 10 has the crankshaft 11, and the fan 29 is constituted by a plurality of the fins 24*a* of the drive pulley 24 that is articulately connected via the CVT input shaft 22 connected to the crankshaft. Further, the fan 85 includes a plurality of the fins 75*a* of the pulley 75 directly connected to the crankshaft 11. Since the fans 29 and 85 are rotationally driven with the rotation of the crankshaft 11, other drive sources for driving the fans 29 and 85 are not required.

(f) The CVT 20 that is connected to the engine 10 and changes a speed of a rotational output output from the engine 10 is further included. The CVT 20 includes the CVT housing 21 that is an outer shell, the CVT input shaft 22 connected to the crankshaft 11, the drive pulley 24 that is attached to the CVT input shaft 22 and rotates integrally with the CVT input shaft 22, the CVT intake duct 27 that has the intake opening 27*b* at a distal end portion and has the proximal end portion 27*a* connected to the CVT housing 21, the fan 29 that is connected to the drive pulley 24 and rotates integrally with the drive pulley 24 to draw outside air into the CVT housing 21 via the CVT intake duct 27, and the CVT exhaust duct 28 through which outside air drawn into the CVT housing 21 is discharged, the CVT exhaust duct 28 having the exhaust opening 28*b* at a distal end portion and the proximal end portion 28*a* connected to the CVT housing 21. As a result, outside air discharged from the CVT housing 21 can be guided to the exhaust pipe 51 and the heat cover 80 via the CVT exhaust duct 27.

(g) The auxiliary case 72 that covers an end portion of the crankshaft 11 protruding from the engine 10, the case intake duct 81 having the intake opening 81*b* at a distal end portion and having the proximal end portion 81*a* connected to the auxiliary case 72, the fan 85 that is connected to the end portion of the crankshaft 11 and draws outside air into the auxiliary case 72 via the case intake duct 81 by rotating integrally with the crankshaft 11, and the case exhaust duct 72 through which outside air drawn into the auxiliary case 72 is discharged, the case exhaust duct 82 having the exhaust opening 82*b* at a distal end portion and having the proximal end portion 82*a* connected to the auxiliary case 72 are included. As a result, outside air discharged from the auxiliary case 72 covering the end portion of the crankshaft 11 can be guided to the exhaust pipe 51 and the heat cover 80 via the case exhaust duct 82. For example, in a case where the auxiliary case 72 has a waterproof structure and accommodates the engine auxiliary 71 driven by the crankshaft 11 inside, outside air discharged from the case exhaust duct 82 can be guided to the exhaust pipe 51 and the heat cover 80 while the engine auxiliary 71 is cooled by outside air drawn in by the fan 85 from the case intake duct 81.

(h) The seat 6 including the seat cushion 62 on which an occupant is seated, and the intake openings 27*b* and 81*b* are located above the seat cushion 62. As a result, since the intake openings 27*b* and 81*b* are located above the seat cushion 62, water intrusion into the CVT intake duct 27 and the case intake duct 81 is suppressed.

(i) The intake openings 27*b* and 81*b* open on the side opposite to the exhaust pipe 51 with respect to the engine 10. As a result, since the intake openings 27*b* and 81*b* take in outside air from a position away from the exhaust pipe 51, outside air warmed by the exhaust pipe 51 is hardly taken in, and cooling performance is easily improved.

(j) The intake opening 81*b* is located behind the seat 6. As a result, entry of foreign materials from the front into the intake opening 81*b* is prevented by the seat 6 located in front of the intake opening 81*b*.

(k) The exhaust openings 28*b* and 82*b* open to the rear of a vehicle. As a result, outside air is discharged from the front toward the rear. In the present embodiment, since the riding space S is located in front of the exhaust pipe 51, outside air blown to the exhaust pipe 51 and the heat cover 80 and raised in temperature is discharged to the rear of the vehicle without being blown to the riding space S, so that the temperature rise of the riding space S is suppressed.

(l) The exhaust openings 28*b* and 82*b* open downward toward the exhaust pipe 51 and the heat cover 80. As a result, a deposit that may be deposited on the exhaust pipe 51 and the heat cover 80 can be effectively blown off and easily removed from the exhaust pipe 51 and the heat cover 80.

(m) In the exhaust openings 28*b* and 82*b*, the dimension D1 in the vertical direction is smaller than the dimension D2 in the horizontal direction. As a result, the outside air discharged from the exhaust openings 28*b* and 82*b* is supplied to a wide range in the horizontal direction of the exhaust pipe 51 and the heat cover 80 while being throttled so that a flow velocity is increased. For this reason, the exhaust pipe 51 and the heat cover 80 can be effectively cooled, and deposits can be effectively removed.

(n) The exhaust pipe 51 and the heat cover 80 are located below the cargo bed 8. As a result, in a utility vehicle in which the exhaust pipe 51 and the heat cover 80 are located below the cargo bed 8, the above effect is suitably exhibited.

(o) The engine 10 is located behind the seat 6. As a result, in a utility vehicle in which the engine 10 is located behind the seat 6, the above effect is suitably exhibited.

(p) Since at least a part of the transmission 30, the intake pipe 41, the air cleaner 42, the exhaust pipe 51, and the exhaust muffler 52 is located in the region Y where the engine 10 is projected in the front-rear direction, the powertrain mechanism 7 of the vehicle is compactly disposed in the vehicle width direction and the vertical direction. In this manner, the vehicle 100 is compactly configured in the vehicle width direction and the vertical direction.

(q) Since the seat 6 is located further to the front than the engine 10, the transfer of heat generated from the engine 10 to the seat 6 is suppressed. In this manner, the discomfort for a person seated in the seat 6 caused by the heat from the engine 10 is suppressed.

(r) Since the vehicle 100 is a utility vehicle, the above effect of the disclosure is preferably exhibited. That is, it is easy to make the height of the cargo bed low while making the dimensions of the utility vehicle in the vehicle width direction compact.

(s) Since the exhaust port 14*b* is provided in a rear portion of the cylinder head 14, when the exhaust system related parts, for example the exhaust muffler 52, which have a relatively high temperature, are disposed away from the seat 6 so as to suppress heat transfer to the seat 6 side, space occupied by a pipe, for example, the exhaust pipe 51 connecting these parts and the cylinder head 14 can be reduced. In this manner, it is easy to compactly configure the powertrain mechanism 7 in the vertical direction and the left-right direction while suppressing the discomfort for an occupant.

(t) Since the air cleaner 42 is disposed under the seat 6, the air cleaner 42 can be disposed by utilizing the dead space under the seat 6, and the intake pipe 41 that connects the cylinder head 14 and the air cleaner 42 disposed on the front side of the cylinder head 14 can be configured to be short.

(u) Since the positions of the exhaust pipe 51 and the exhaust muffler 52 are different in the front-rear direction, the exhaust muffler 52 can be easily disposed further above as compared with the case where the exhaust pipe 51 and the exhaust muffler 52 are disposed overlapping in the vertical direction. In this manner, it is easy to suppress the intrusion of water into the engine 10 through the tail pipe 52*c* of the exhaust muffler 52, and it is easy to suppress the contact of water to the exhaust pipe 51, which affects the engine performance by being cooled.

(v) Since the top portion 54*z* of the exhaust pipe 51 is located at almost the same height as the horizontal plane W2 passing through an upper end portion of the cylinder head 14 in the vertical direction, it is easy to suppress the contact of the exhaust pipe 51 with water more while the powertrain mechanism 7 is compactly configured in the vertical direction.

(w) Since an upper end portion of the exhaust muffler 52 is located at substantially the same height as the horizontal plane W2 passing through an upper end portion of the cylinder head 14 in the vertical direction, it is easy to dispose the exhaust muffler 52 further above. In this manner, it is further easier to suppress water intrusion into the exhaust muffler 52 while keeping the powertrain mechanism 7 compact in the vertical direction.

(z) Since a front end upper portion of the transmission 30 is adjacent to the left side of the upstream side exhaust pipe 51*a* (front half portion) of the exhaust pipe 51, the transmission 30 can be easily configured to be long in the vertical direction while interference with the exhaust pipe 51 is prevented. In this manner, the transmission 30 can be compactly configured in the front-rear direction.

(aa) Since the second independent exhaust pipe 54B curves to the opposite side to the CVT 20, that is right side, immediately after the exhaust port 14*b*, it is easy to configure the exhaust pipe 51 in a manner that interference with the transmission 30 is reduced. Further, as compared with the case where the exhaust pipe 51 is curved toward the CVT 20 side, it is easy to lengthen the exhaust pipe 51 and improve the engine performance.

(ab) Since an upper portion of the transmission 30 is inclined downward toward the rear, it is easier to further configure the exhaust pipe 51 so as to suppress interference with the transmission 30.

(ac) Since the CVT exhaust duct 28 is located above the transmission 30 and below an upper end portion of the CVT housing 21, it is easy to compactly arrange the CVT exhaust duct 28 above the transmission 30. In this manner, rising of the height position of the cargo bed 8 is suppressed while the CVT exhaust duct 28 is provided.

(ad) Since the engine auxiliary 71 is covered from the vehicle width direction by the auxiliary case 72, the engine auxiliary 71 can be protected from a foreign matter such as water and sand. In particular, the effect of the present disclosure is preferably exhibited in a case where the vehicle travels on a submerged road, an uneven terrain road, and the like.

(ae) Since the auxiliary case 72 is provided with the case intake duct 81 and the case exhaust duct 82, the engine auxiliary 71 accommodated in the auxiliary case 72 is effectively cooled.

(af) Since the air cleaner 42 is disposed so as to have the upper end located below the horizontal plane W2 passing through an upper end portion of the cylinder head 14, an increase in the dimension in the vertical direction of the powertrain mechanism 7 can be suppressed and the powertrain mechanism 7 can be easily accommodated in a limited space.

(ag) Since the air cleaner 42 is disposed on the front side of the engine 10 so as to extend over from the engine 10 to the CVT 20 in the vehicle width direction, it is easy to increase the capacity of the air cleaner 42. Further, since the air cleaner 42 is located on the inner side, that is right side, in the vehicle width direction than a left end portion of the CVT 20, it is easy to compactly configure the powertrain mechanism 7 as a whole in the vehicle width direction. Therefore, it is easy to secure the mountability of the powertrain mechanism 7 on the vehicle 100 while configuring the air cleaner 42 to be large in the vehicle width direction.

(ah) The air cleaner 42 is disposed on the front side with respect to the engine 10 with space between them, and is disposed directly under the driver's seat 6A. In this manner, it is easy to suppress heat transfer from the engine 10 to the air cleaner 42. Further, it is easy to access the air cleaner 42 from seat 6 and maintainability is excellent. Further, since the air cleaner 42 is disposed directly under the driver's seat 6A, the space below the passenger seat 6B can be configured as, for example, a storage space.

(ai) Since the exhaust pipe 51 passes through a region on the outer side, that is right side, in the vehicle width direction than the cylinder head cover 15, it is easy to lengthen the exhaust pipe 51. Further, since the exhaust pipe 51 extends inward, that is left side, in the vehicle width direction than an outer end portion, that is, right end portion, in the vehicle width direction of the auxiliary transmission unit 130, it is easy to compactly configure the powertrain mechanism 7 as a whole in the vehicle width direction. That is, deterioration in the mountability of the powertrain mechanism 7 on the vehicle 100 can be suppressed while the exhaust length is lengthened.

(aj) The exhaust muffler 52 is connected to a downstream portion of the exhaust pipe 51, and the exhaust muffler 52 has the muffler inlet portion 52*b* (connection portion) connected to the exhaust pipe 51 on the front surface and in a left end portion. In this manner, the exhaust pipe 51 can be extended in an S-shape, and the length of the exhaust pipe can be easily increased. Further, the exhaust muffler 52 and the exhaust pipe 51 can be easily disposed in the front-rear direction, and the exhaust muffler 52 can be easily disposed so that the upper end is located above the lower end of the exhaust pipe 51. Furthermore, since the exhaust muffler 52 can be disposed behind the exhaust pipe 51, the influence of the temperature due to the exhaust muffler 52 with respect to the engine 10 and other units is suppressed.

Figure 12:
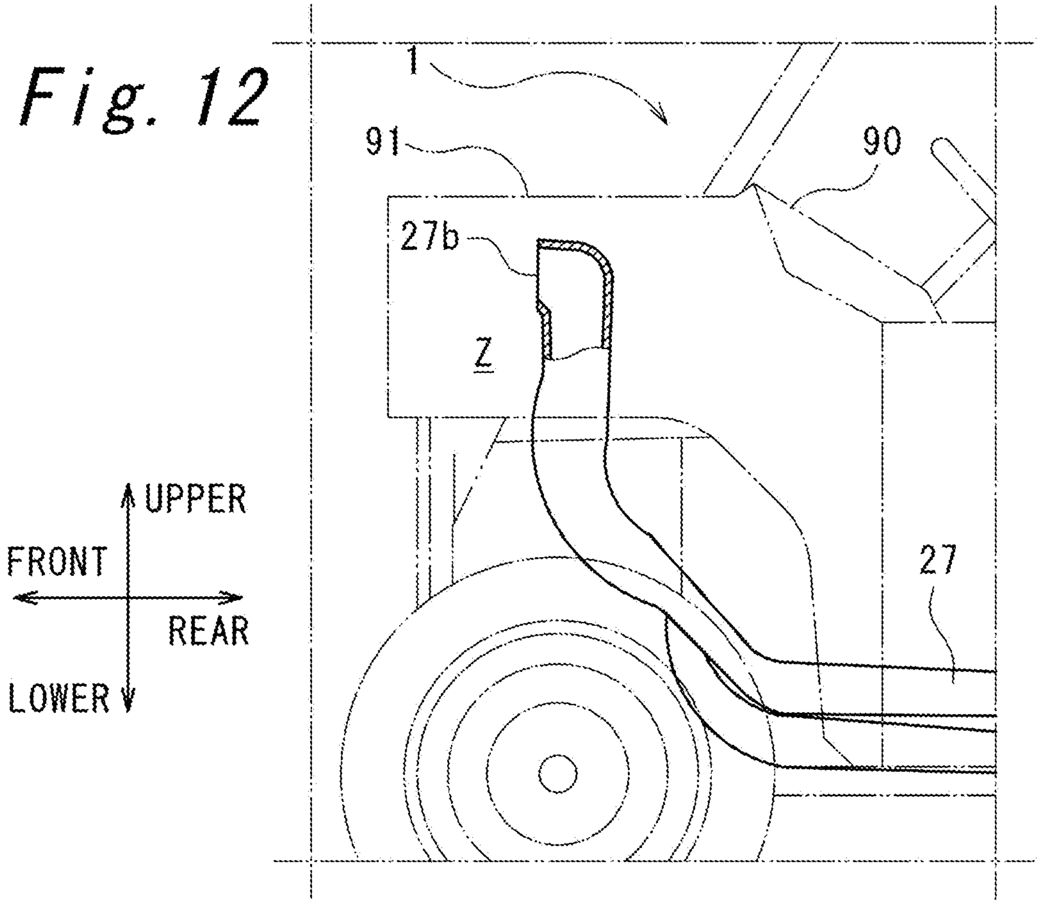
FIG. 12 is a side view of an area around an intake opening of a CVT exhaust duct according to a variation.

In the above embodiment, the case where the intake opening 27*b* of the CVT intake duct 27 and an intake opening of the engine intake duct 43 open upward is described as an example. However, the present disclosure is not limited to this configuration. As illustrated in FIG. 12, the intake opening 27*b* of the CVT intake duct 27 and an intake opening of the engine intake duct 43 may be configured to open forward. That is, the intake opening 27*b* of the CVT exhaust duct 27 and the intake opening of the engine intake duct 43 may be configured to open in a direction opposite to the exhaust system 50 with respect to the engine 10, so that it is possible to configure such that cool air is more easily taken in without being affected by heat by the exhaust system 50.

Figure 13:
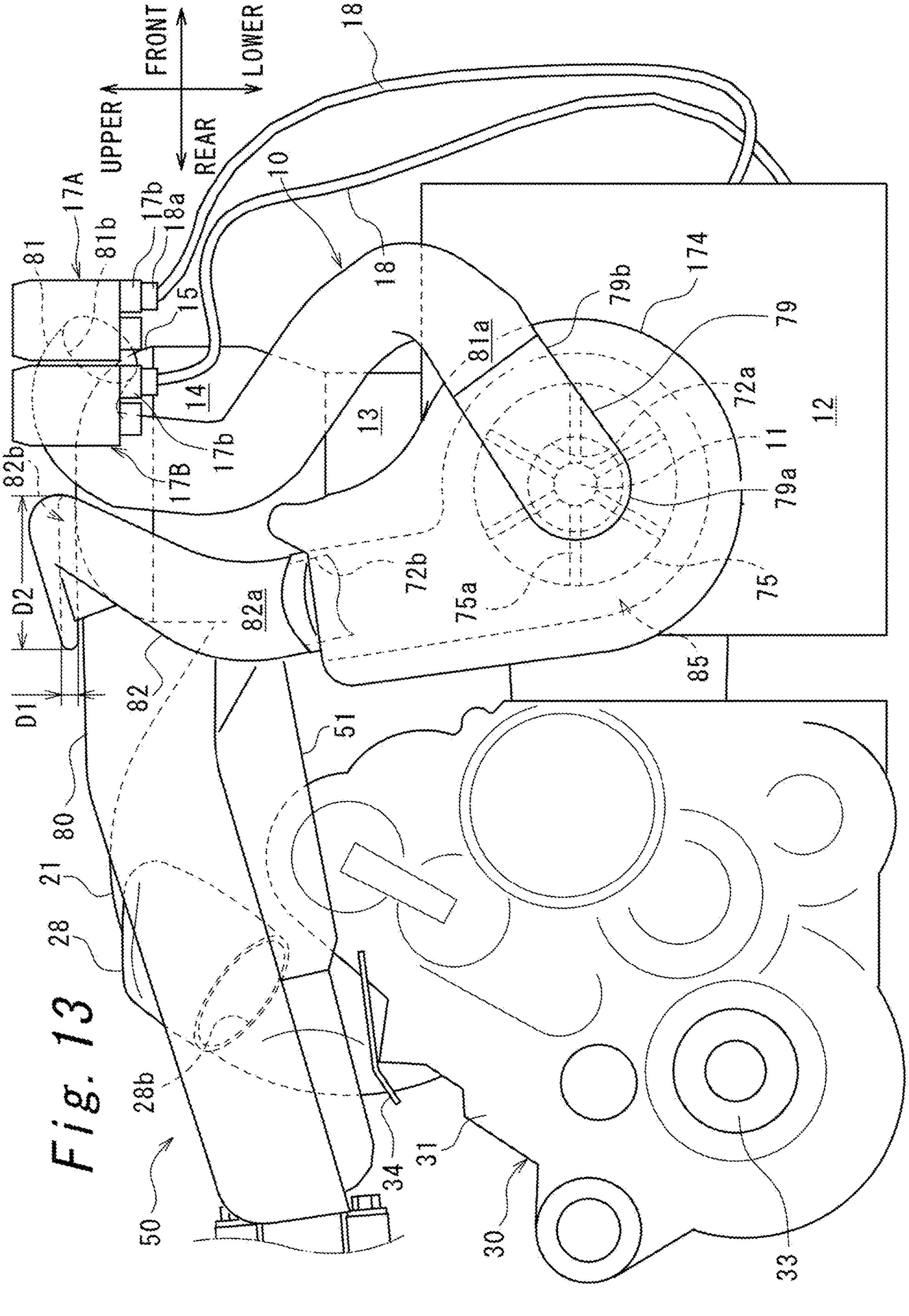
FIG. 13 is a right side view of an area around the engine according to the variation.

In the above embodiment, the case where the air conditioner compressor 71A is accommodated in the auxiliary case 72 is described as an example. However, the present disclosure is not limited to this configuration. For example, as illustrated in FIG. 13, the present disclosure may be applied to a case where the air conditioner compressor 71A is not included in an auxiliary case 174, and in this case, the auxiliary case 174 is configured to be as large as just including the fan 85.

Second Embodiment

Figure 14:
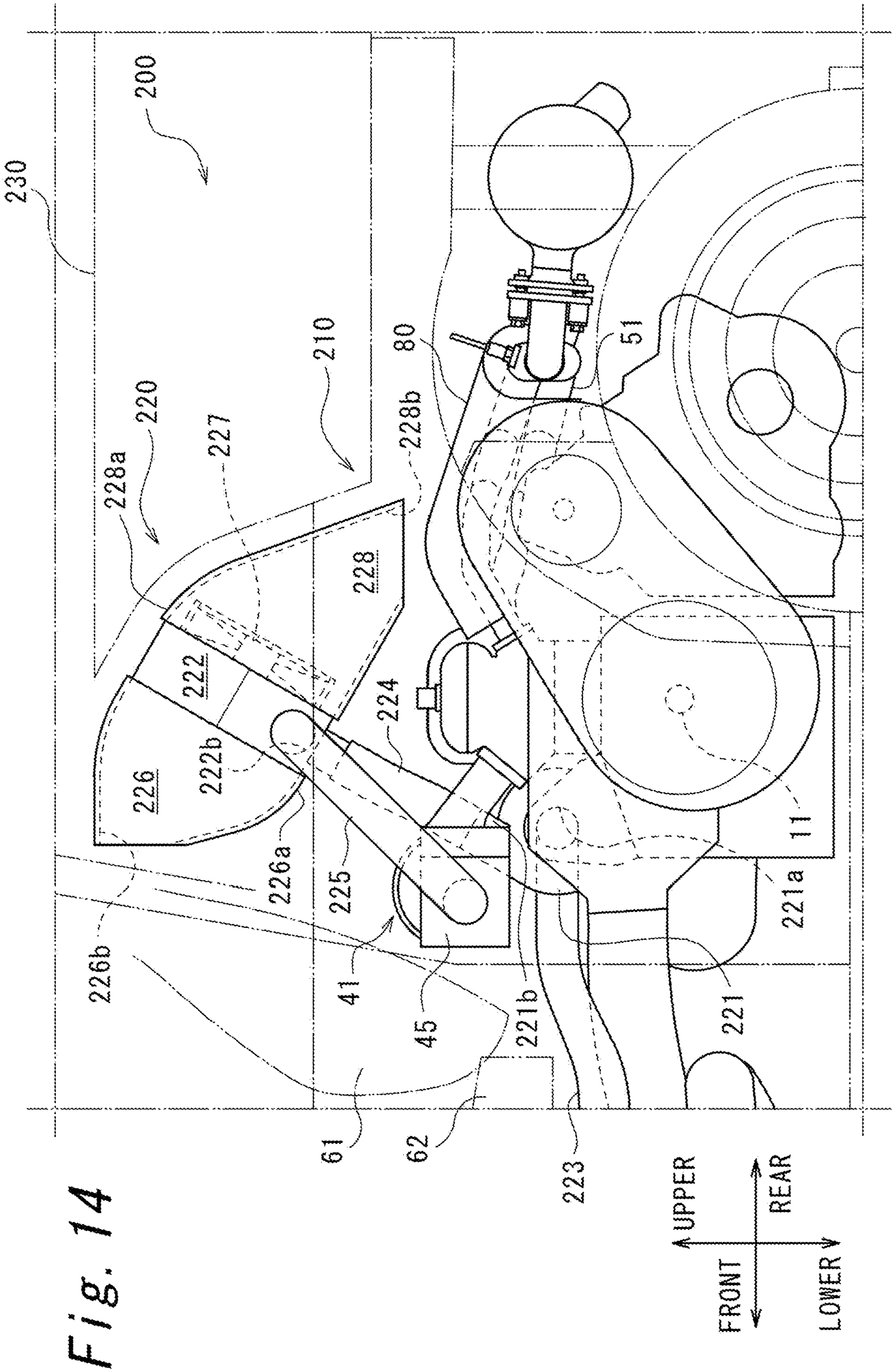
FIG. 14 is a right side view of an area around the engine according to a second embodiment of the present disclosure.

A utility vehicle 200 according to a second embodiment will be described. In description below, the same reference numerals are used for members common to the first embodiment, and description of such members will be omitted. FIG. 14 is an enlarged right side view illustrating an area around an engine 210 of the utility vehicle 200. As illustrated in FIG. 14, the engine 210 includes a supercharging system 220 that supplies compressed air to the intake pipe 41. The supercharging system 220 includes a supercharger 221 and a heat exchanger 222 interposed between the supercharger 221 and the intake pipe 41.

In the present embodiment, the supercharger 221 is a supercharger that is mechanically rotationally driven using the rotation of the crankshaft 11. An inlet 221*a* of the supercharger 221 is connected to the air cleaner 42 via an air hose 223. An outlet 221*b* of the supercharger 221 is connected to an inlet 222*a* of a heat exchanger 222 via an air hose 224. An outlet 222*b* of the heat exchanger 222 is connected to an inlet of a throttle body 45 via an air hose 225. That is, air taken in from the air cleaner 42 through the air hose 223 is supercharged by the supercharger 221, then cooled in the heat exchanger 222, and supplied to the throttle body 45.

Figure 15:
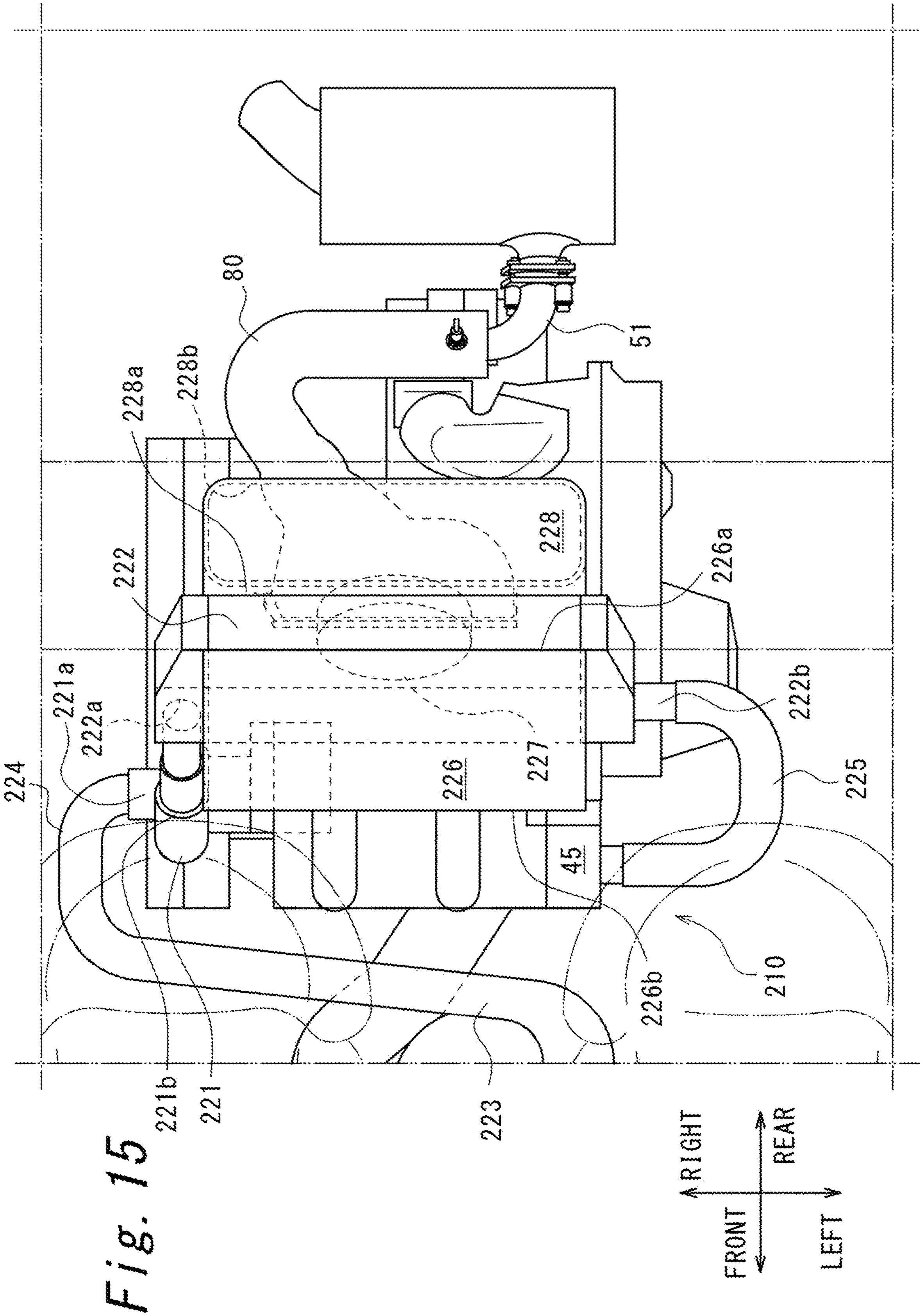
FIG. 15 is a top view of an area around the engine of FIG. 14.

The heat exchanger 222 is arranged above the engine 10 and between the seat 6 and a cargo bed 230 in the front-rear direction. The cargo bed 230 has a shorter front end than the cargo bed 8 of the vehicle 100 according to the first embodiment. FIG. 15 is an enlarged top view illustrating an area around the engine 210 of the utility vehicle 200. Referring also to FIG. 15, the heat exchanger 222 has a horizontally long substantially rectangular parallelepiped shape, and is arranged in a posture in which the thickness direction is directed in a direction inclined downward toward the rear. A width of the heat exchanger 222 in the left-right direction is substantially equal to a width of the engine 210. The heat exchanger 222 exchanges heat between compressed air introduced from the inlet 222*a* and outside air to cool the compressed air, and discharges the compressed air from the outlet 222*b*.

As illustrated in FIG. 14, a heat exchanger inlet duct 226, a fan 227, and a heat exchanger outlet duct 228 are mounted on the heat exchanger 222. The heat exchanger inlet duct 226 has a proximal end portion 226*a* adjacent to a front end of the heat exchanger 222, and has an intake opening 226*b* opening forward at the front end. The intake opening 226*b* opens forward behind the seat back 61 and above the seat cushion 62. The heat exchanger outlet duct 228 has a proximal end portion 228*a* adjacent to a rear end of the heat exchanger 222, and has an exhaust opening 228*b* opening rearward at the rear end. The exhaust opening 228*b* opens in a direction inclined downward toward the rear above the exhaust pipe 51 and the heat cover 80.

The fan 227 is attached to a rear surface of the heat exchanger 222 and is accommodated inside the heat exchanger outlet duct 228. The fan 227 is rotationally driven by an electrically driven motor, and draws outside air toward the heat exchanger 222 via the heat exchanger inlet duct 226 to cause the outside air to pass through the heat exchanger 222 in the front-rear direction. In this manner, intake air heated by being supercharged in the supercharger 222 is cooled by heat exchange with the outside air in the heat exchanger 222. The outside air having passed to the rear through the heat exchanger 222 is guided from the upper side to the rear side with respect to the exhaust pipe 51 and the heat cover 80 from the exhaust opening 228*b* via the heat exchanger outlet duct 228. As a result, outside air having passed through the heat exchanger 222 can be guided to the exhaust pipe 51 and the heat cover 80 via the heat exchanger exhaust duct 228. Accordingly, the air guide can be easily configured.

In the above embodiment, the case where the supercharger 221 is a supercharger has been described as an example, but the forced induction device may be configured as an exhaust turbocharger.

Third Embodiment

Figure 16:
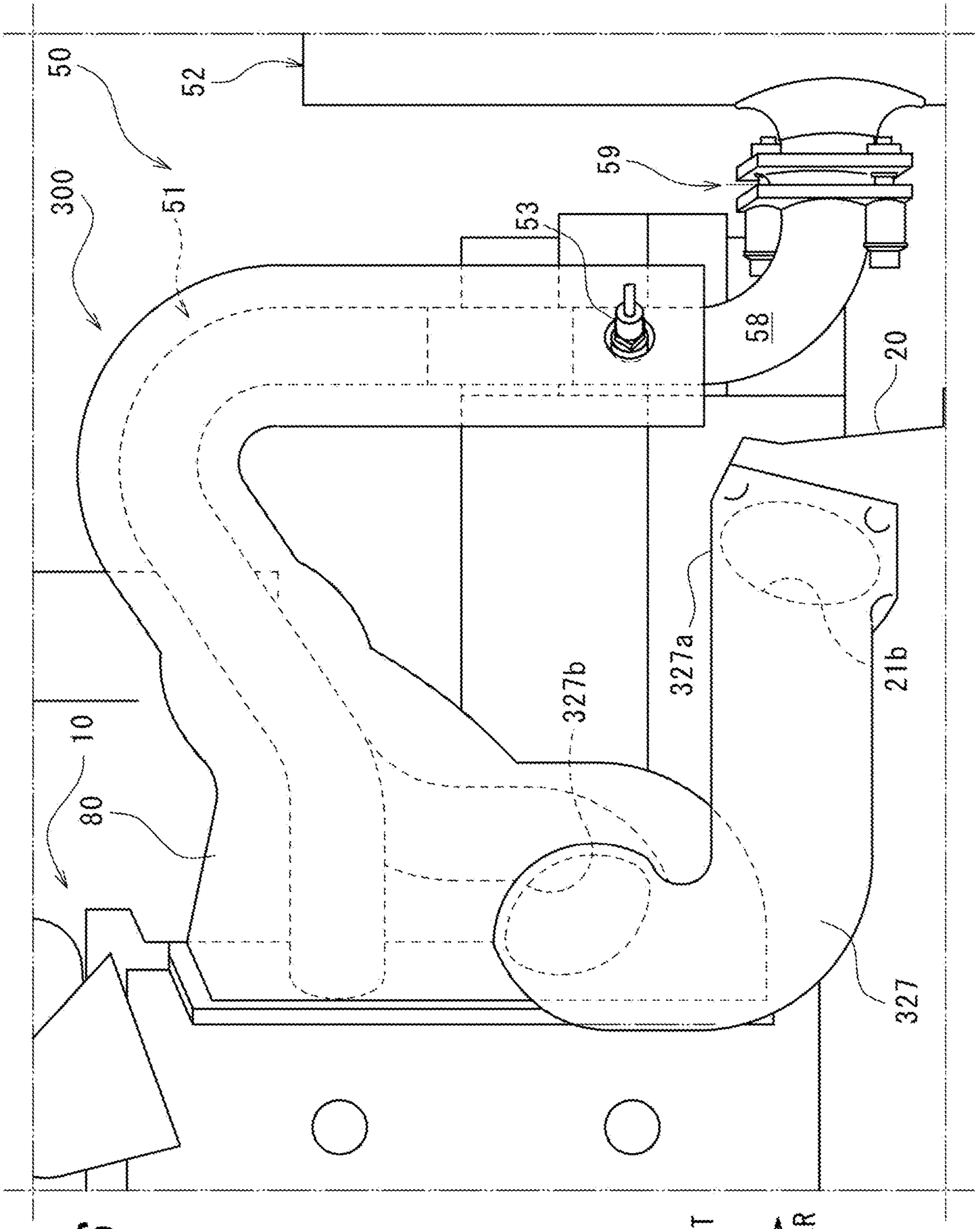
FIG. 16 is a top view of the engine according to a third embodiment.
Figure 16:
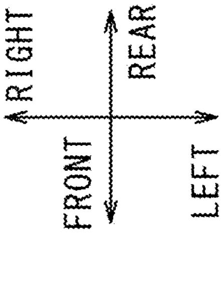

A utility vehicle 300 according to a third embodiment will be described. In description below, the same reference numerals are used for members common to the first embodiment, and description of such members will be omitted. FIG. 16 is an enlarged right side view illustrating an area around the engine 10 of the utility vehicle 300. As illustrated in FIG. 16, the utility vehicle 300 differs from the utility vehicle 100 according to the first embodiment in a configuration of a CVT exhaust duct 327.

The CVT exhaust duct 327 extends forward from a proximal end portion 327*a* and is curved by approximately 180° inward in the vehicle width direction, that is, to the right above the exhaust pipe 51 and a front end of the heat cover 80. An exhaust opening 327*b* at a distal end portion of the CVT exhaust duct 327 opens in a direction inclined downward from the upper side toward the rear side with respect to the exhaust pipe 51 and the heat cover 80. That is, the exhaust pipe 51 and the heat cover 80 can be cooled by outside air discharged from the exhaust opening 327*b* of the CVT exhaust duct 327, and deposition of foreign materials on the heat cover 80 can be suppressed. The intake rear 27*b* of the CVT intake duct 27, the fan 29, and the exhaust opening 327*b* of the CVT exhaust duct 327 also constitute the air guide. The exhaust opening 327*b* of the CVT exhaust duct 327 may have a dimension in the vertical direction smaller than a dimension in the horizontal direction. In this manner, outside air exhausted through the CVT exhaust duct 327 is exhausted to a wide range in the horizontal direction toward the heat cover 80 while being throttled in the vertical direction at the exhaust opening 327*b* so that a flow velocity is increased, and the cooling performance of the heat cover 80 and the exhaust system 50 can be further improved.

One or a plurality of the various air guide described in the first to third embodiments may be appropriately combined.

In the above embodiment, the regulator 17 is described as an example of the heat generating component according to the present disclosure, but the heat generating component according to the present disclosure is not limited to the regulator 17. For example, the heat generating component according to the present disclosure may be an engine control unit (ECU).

In the above embodiment, the case where the air box 46 is interposed between the throttle body 45 and the air cleaner 42 is described as an example. However, the air box 46 is not necessarily needed. That is, the throttle body 45 and the air cleaner 42 may be configured to be directly connected by an air pipe. Further, in the above embodiment, the case where the throttle body 45 is arranged at an inlet of the intake manifold 44 and an air amount is adjusted by a single throttle is as an example. However, the present disclosure is not limited to this configuration. For example, an air box may be arranged instead of the intake manifold, a throttle may be arranged in each independent port portion connecting the air box and each of the intake port 14*a*, and the air amount may be adjusted by each throttle in each of the independent port portions.

Further, in the above embodiment, the case where the exhaust pipe 51 and the exhaust muffler 52 are directly connected is described as an example. However, another exhaust pipe may be interposed between the exhaust pipe 51 and the exhaust muffler 52, so that the exhaust pipe 51 and the exhaust muffler 52 are configured to be indirectly connected.

In the above embodiment, the case where the rotational torque output from the engine 10 is changed in velocity by the CVT 20 and the transmission 30 is described as an example. However, a dual clutch transmission (DCT) may be mounted instead of the CVT 20 and the transmission 30, and the velocity may be changed by the DCT, or a DCT may be mounted instead of the CVT 20, and the velocity may be changed by the DCT and the transmission 30.

What is claimed is:

1. A utility vehicle comprising:

an engine;

a continuously variable transmission connected to the engine;

an exhaust pipe connected to the engine and through which exhaust gas from the engine is discharged;

a heat generating component that generates heat during driving of the engine; and an air guide that guides outside air from the heat generating component toward the exhaust pipe, wherein the air guide includes:

an intake opening that is arranged facing the heat generating component and through which outside air is introduced;

a fan that draws outside air into the intake opening; and an exhaust port through which outside air drawn in by the fan is discharged toward the exhaust pipe.

2. The utility vehicle according to claim 1, wherein the intake opening is opened in a left-right direction, and the intake opening and the heat generating component are arranged side by side in the left-right direction and overlap in a front-rear direction and a vertical direction.

3. The utility vehicle according to claim 1, wherein the engine includes a crankshaft, the utility vehicle includes a generator that is rotationally driven in accordance with rotation of the crankshaft to generate electric power, and the heat generating component is a regulator that is arranged away from the generator, is electrically connected to the generator, and controls voltage of power generated by the generator.

4. The utility vehicle according to claim 3, further comprising a wiring having a terminal connected to the regulator and electrically connecting the generator to the regulator, wherein the regulator includes a terminal connection portion to which the terminal is connected, and the intake opening faces the terminal connection portion.

5. The utility vehicle according to claim 4, wherein the terminal connection portion is arranged on an axis of the intake opening.

6. The utility vehicle according to claim 1, further comprising:

a cargo bed; and a frame that supports the cargo bed and extends in a front-rear direction, wherein the heat generating component is attached to an inner side of the frame in a vehicle width direction.

7. The utility vehicle according to claim 4, wherein the regulator is arranged at a position not exposed to traveling wind.

8. The utility vehicle according to claim 1, wherein the heat generating component is a regulator or an engine control unit.

9. The utility vehicle according to claim 1, wherein the fan is arranged inside a case, and the air guide includes an intake duct having a proximal end portion and a distal end portion, the proximal end portion of the intake duct being connected to the case, and the intake opening being positioned at the distal end portion of the intake duct.

10. A utility vehicle comprising:

an engine;

an exhaust pipe connected to the engine and through which exhaust gas from the engine is discharged;

a heat generating component that generates heat during driving of the engine; and an air guide that guides outside air from the heat generating component toward the exhaust pipe, wherein the air guide includes:

an intake opening that is arranged facing the heat generating component and through which outside air is introduced;

a fan that draws outside air into the intake opening; and an exhaust port through which outside air drawn in by the fan is discharged toward the exhaust pipe, wherein the intake opening is opened in a left-right direction, and the intake opening and the heat generating component are arranged side by side in the left-right direction and overlap in a front-rear direction and a vertical direction.

11. A utility vehicle comprising:

an engine;

an exhaust pipe connected to the engine and through which exhaust gas from the engine is discharged;

a heat generating component that generates heat during driving of the engine; and an air guide that guides outside air from the heat generating component toward the exhaust pipe, wherein the air guide includes:

an intake opening that is arranged facing the heat generating component and through which outside air is introduced;

a fan that draws outside air into the intake opening; and an exhaust port through which outside air drawn in by the fan is discharged toward the exhaust pipe, wherein the engine includes a crankshaft, the utility vehicle includes a generator that is rotationally driven in accordance with rotation of the crankshaft to generate electric power, and the heat generating component is a regulator that is arranged away from the generator, is electrically connected to the generator, and controls voltage of power generated by the generator.

* * * * *